(12) United States Patent
Lin et al.

(10) Patent No.: US 8,279,976 B2
(45) Date of Patent: Oct. 2, 2012

(54) SIGNALING WITH SUPERIMPOSED DIFFERENTIAL-MODE AND COMMON-MODE SIGNALS

(75) Inventors: Qi Lin, Mountain View, CA (US); Hae-Chang Lee, Los Altos, CA (US); Jaeha Kim, Los Altos, CA (US); Brian S. Leibowitz, San Francisco, CA (US); Jared L. Zerbe, Woodside, CA (US); Jihong Ren, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 128 days.

(21) Appl. No.: 12/739,938

(22) PCT Filed: Oct. 28, 2008

(86) PCT No.: PCT/US2008/081478
§ 371 (c)(1),
(2), (4) Date: Apr. 26, 2010

(87) PCT Pub. No.: WO2009/058790
PCT Pub. Date: May 7, 2009

(65) Prior Publication Data
US 2010/0272215 A1    Oct. 28, 2010

Related U.S. Application Data

(60) Provisional application No. 60/983,901, filed on Oct. 30, 2007, provisional application No. 61/029,902, filed on Feb. 19, 2008.

(51) Int. Cl.
*H03K 9/00* (2006.01)
(52) U.S. Cl. ........ 375/316; 375/257; 375/347; 375/288; 375/350; 375/222; 375/354; 375/371
(58) Field of Classification Search ............. 375/316, 375/222, 257, 288, 350, 354, 347, 371; 330/9, 330/69, 282, 308; 702/104, 189; 326/68, 82, 83
See application file for complete search history.

(56) References Cited

U.S. PATENT DOCUMENTS
4,201,942 A    5/1980   Downer ................... 375/17
(Continued)

FOREIGN PATENT DOCUMENTS
JP    2002-204272 A    7/2002
(Continued)

OTHER PUBLICATIONS

International Search Report and Written Opinion issued in PCT/US2008/081477, Mar. 27, 2009, 9 pages by ISA/KR.
(Continued)

*Primary Examiner* — Dhaval Patel
(74) *Attorney, Agent, or Firm* — Morgan, Lewis & Bockius LLP

(57) ABSTRACT

A data receiver circuit (206) includes first and second interfaces (221) coupled to first and second respective transmission lines (204). The first and second respective transmission lines comprise a pair of transmission lines external to the data receiver circuit. The first and second interfaces receive a transmission signal from the pair of transmission lines. A common mode extraction circuit (228) is coupled to the first and second interfaces to extract a common-mode clock signal from the received transmission signal. A differential mode circuit (238) is coupled to the first and second interfaces to extract a differential-mode data signal from the received transmission signal. The extracted data signal has a symbol rate corresponding to a frequency of the extracted clock signal (e.g., —the symbol rate may be twice the frequency of the extracted clock signal). The differential mode circuit is synchronized to the extracted clock signal.

24 Claims, 22 Drawing Sheets

U.S. PATENT DOCUMENTS

| | | | | |
|---|---|---|---|---|
| 5,600,634 | A | 2/1997 | Satoh et al. | 370/294 |
| 6,115,430 | A | 9/2000 | Tanaka et al. | 375/318 |
| 6,137,332 | A | 10/2000 | Inoue et al. | 327/256 |
| 6,492,984 | B2 | 12/2002 | Martin | 345/213 |
| 7,064,585 | B2 * | 6/2006 | Glass | 327/58 |
| 7,158,593 | B2 | 1/2007 | Kim et al. | 375/354 |
| 7,508,881 | B2 | 3/2009 | Choi et al. | 375/288 |
| 7,609,102 | B2 * | 10/2009 | Shanbhag et al. | 327/231 |
| 2004/0239374 | A1 | 12/2004 | Hori | 327/65 |
| 2008/0056415 | A1 * | 3/2008 | Chang et al. | 375/349 |

FOREIGN PATENT DOCUMENTS

WO     WO 00/22499 A2     4/2000

OTHER PUBLICATIONS

International Search Report and Written Opinion issued in PCT/US2008/081478, Jan. 8, 2009, 10 pages by ISA/EP.

Gabara T., Phantom Mode Signaling in VLSI Systems, Advanced Research in VLSI, 2001. Proceedings of ARVLSI 2001 Conference, Mar. 14-16, 2001, Piscataway, NJ, pp. 88-100.

* cited by examiner

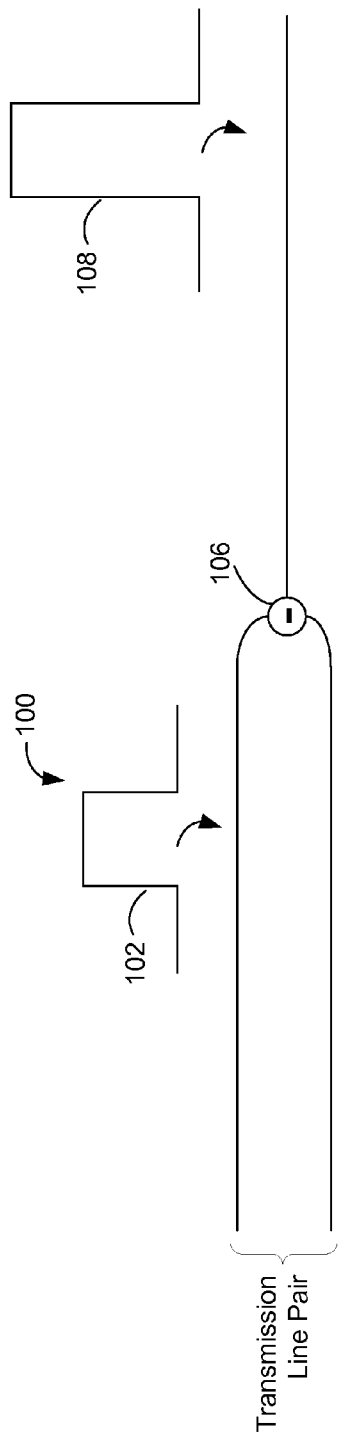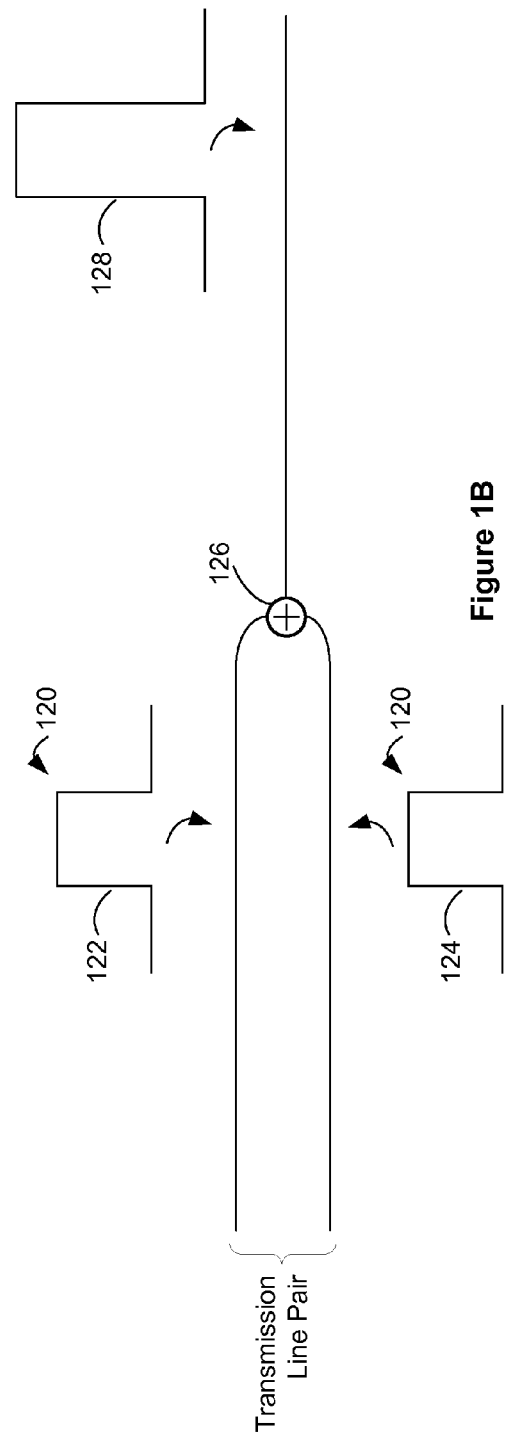

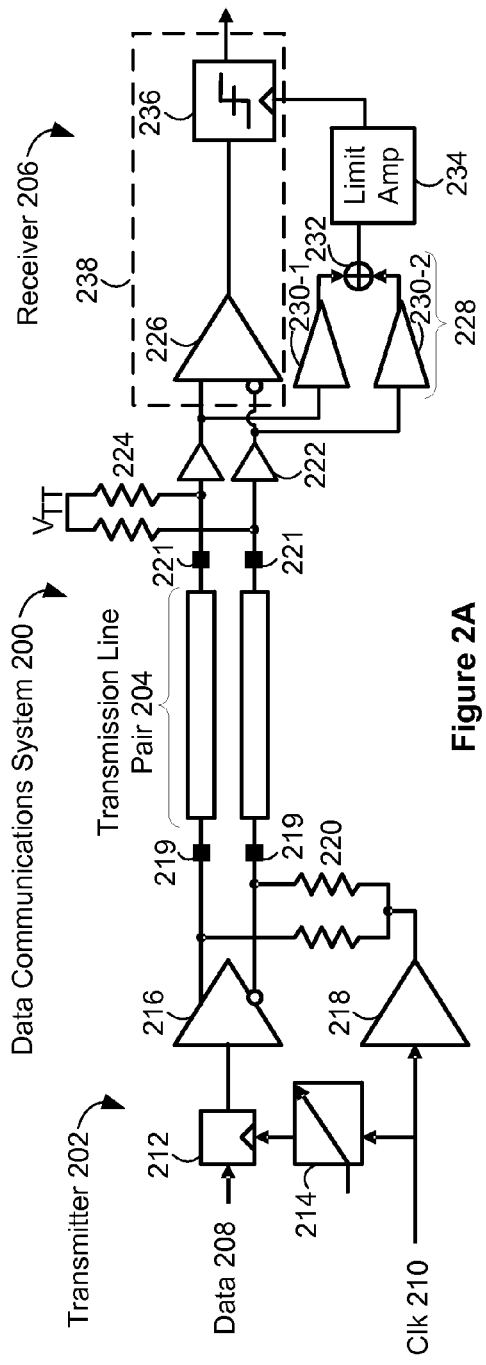
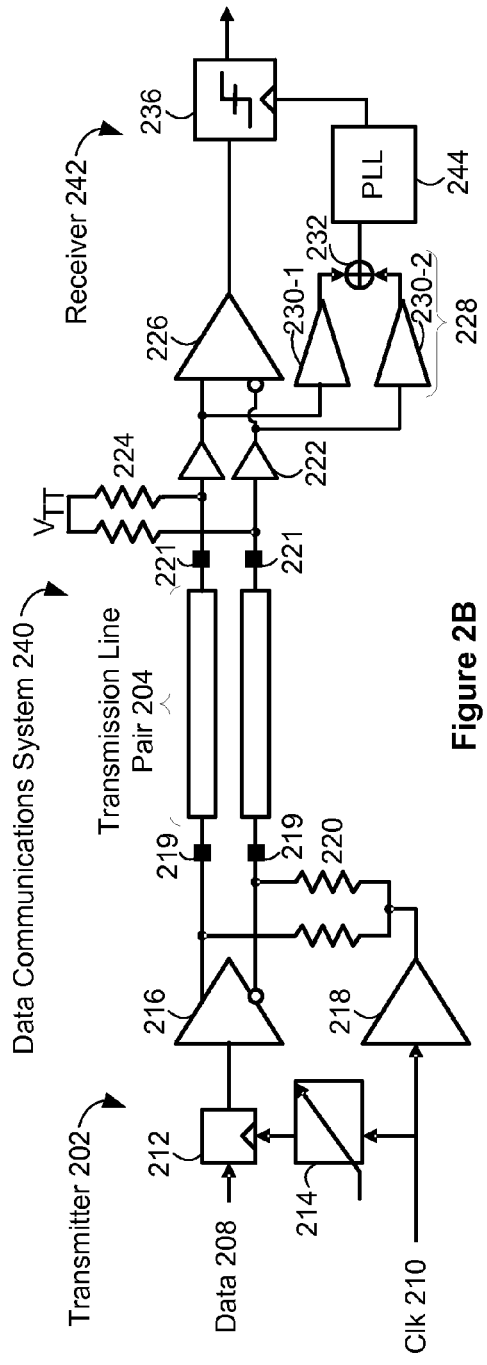
Figure 2A
Figure 2B

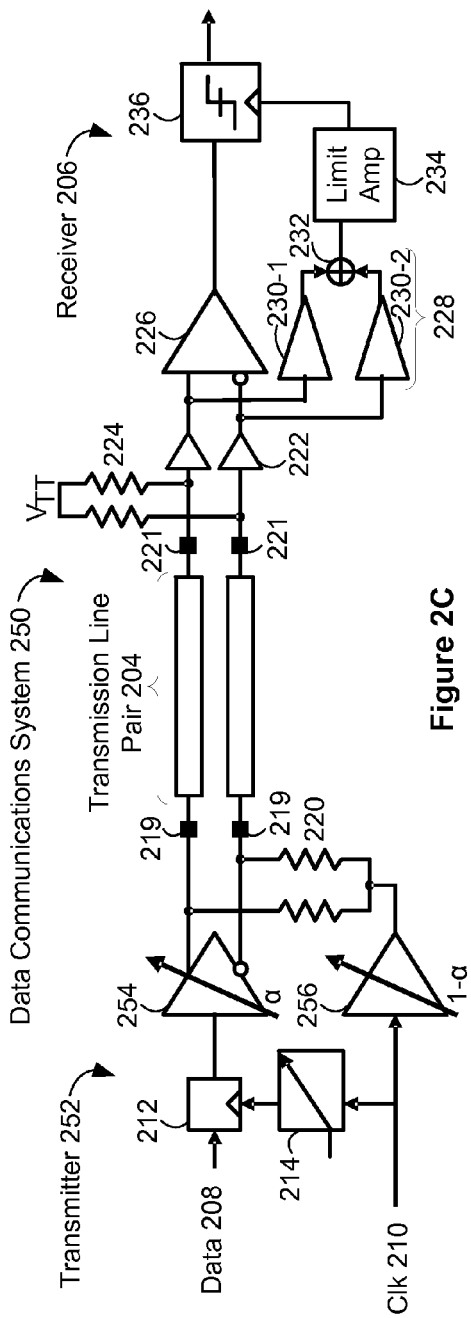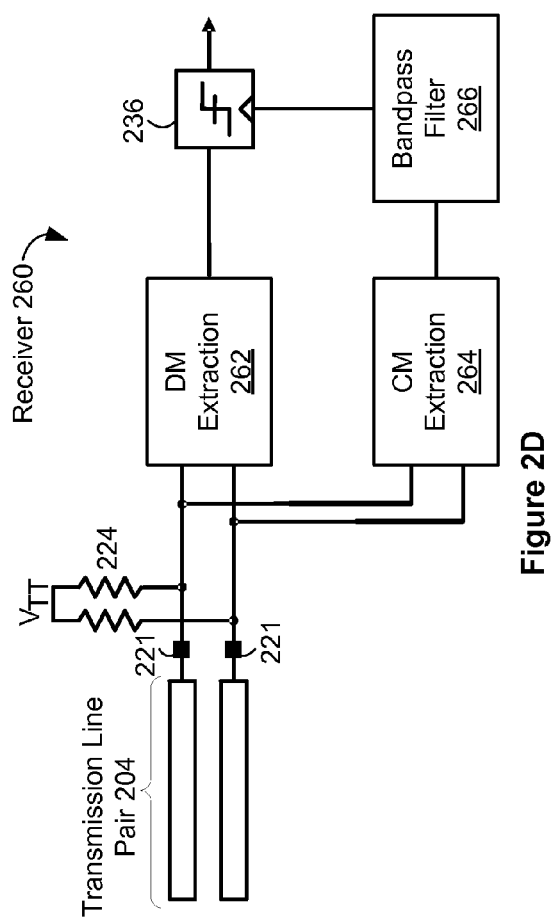

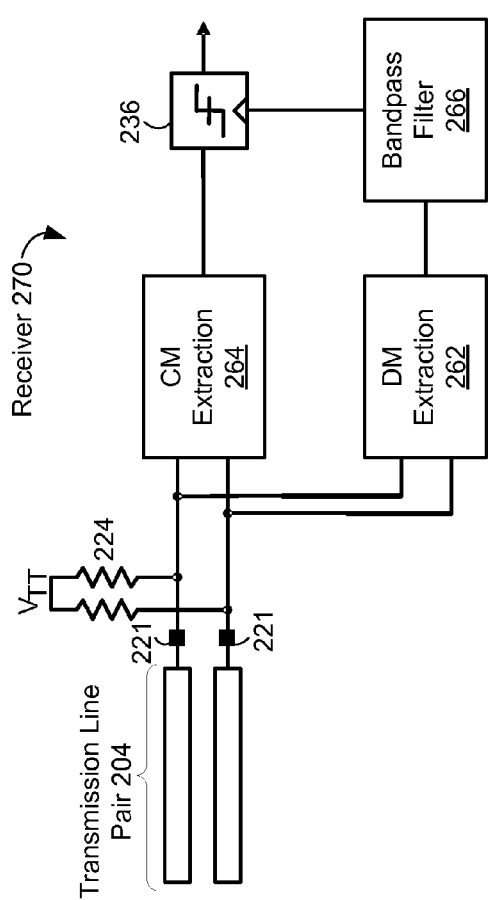
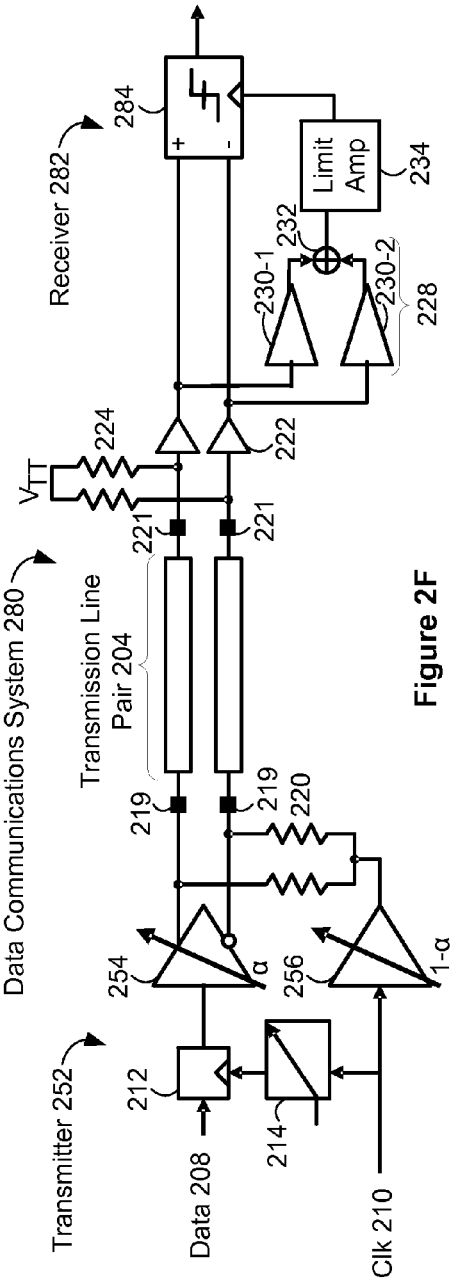

SIGNALING WITH SUPERIMPOSED DIFFERENTIAL-MODE AND COMMON-MODE SIGNALS

CROSS-REFERENCE TO RELATED APPLICATIONS

This Application is a United States National Stage Application filed under 35 U.S.C. §371 of PCT Patent Application Serial No. PCT/US2008/081478 filed on Oct. 28, 2008, which claims the benefit of and priority to U.S. Provisional Patent Application Ser. No. 60/983,901 filed on Oct. 30, 2007 and to U.S. Provisional Patent Application Ser. No. 61/029,902 filed on Feb. 19, 2008, the disclosures of all of which are hereby incorporated by reference in their entirety.

TECHNICAL FIELD

The disclosed embodiments relate generally to data communications, and more particularly, to high speed electronic signaling within and between integrated circuits.

BACKGROUND

High speed data communications over a communications channel such as a backplane electrical link present significant engineering challenges. For example, edge-based clock and data recovery (CDR) limits receiver performance.

BRIEF DESCRIPTION OF THE DRAWINGS

FIG. 1A is a schematic illustration of differential-mode signaling in accordance with some embodiments.

FIG. 1B is a schematic illustration of common-mode signaling in accordance with some embodiments.

FIGS. 2A-2C and 2F are block diagrams of a data communications system in accordance with some embodiments.

FIGS. 2D and 2E are block diagrams of a receiver in accordance with some embodiments.

Like reference numerals refer to corresponding parts throughout the drawings.

DESCRIPTION OF EMBODIMENTS

Figure 1C:
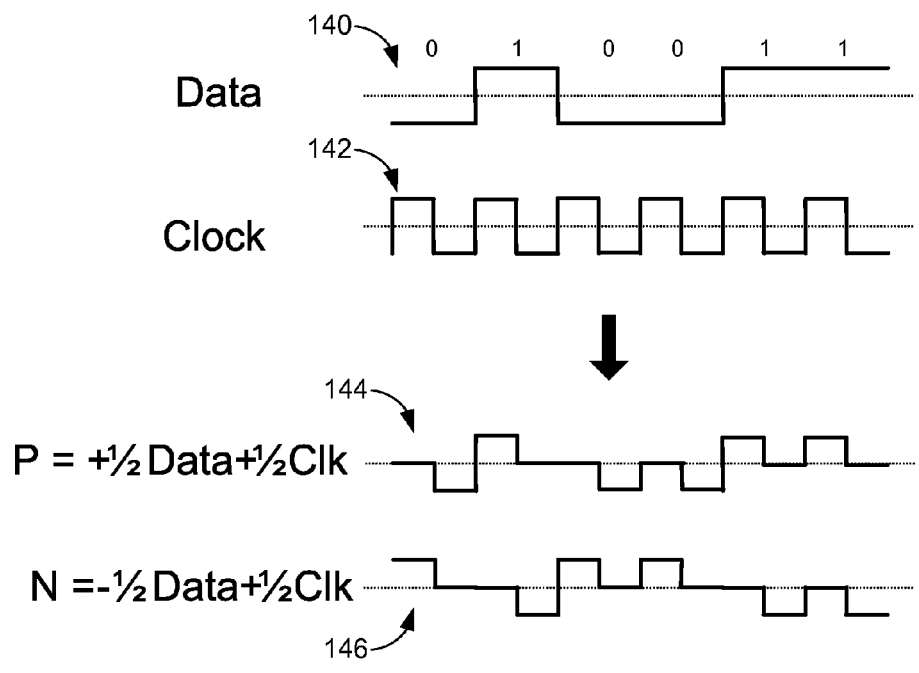
FIGS. 1C and 1D illustrate waveforms associated with simultaneously transmitting differential-mode 'Data' and common-mode 'Clock' signals over a pair of transmission lines in accordance with some embodiments.

In some embodiments, a data receiver circuit includes first and second interfaces coupled to first and second respective transmission lines. The first and second respective transmission lines comprise a pair of transmission lines external to the data receiver circuit. The first and second interfaces receive a transmission signal from the pair of transmission lines. A common mode extraction circuit is coupled to the first and second interfaces to extract a common-mode clock signal from the received transmission signal. A differential mode circuit is coupled to the first and second interfaces to extract a differential-mode data signal from the received transmission signal. The extracted data signal has a symbol rate corresponding to a frequency of the extracted clock signal. The differential mode circuit is synchronized to the extracted clock signal.

In some embodiments, a data receiver circuit includes first and second interfaces coupled to first and second respective transmission lines. The first and second respective transmission lines comprise a pair of transmission lines external to the data receiver circuit. The first and second interfaces receive a transmission signal from the pair of transmission lines. A differential mode extraction circuit is coupled to the first and second interfaces to extract a differential-mode clock signal from the received transmission signal. A common mode extraction circuit is coupled to the first and second interfaces to extract a common-mode data signal from the received transmission signal. The extracted data signal has a symbol rate corresponding to a frequency of the extracted clock signal. A sampling circuit samples the extracted data signal. The sampling circuit is synchronized to the extracted clock signal.

In some embodiments, a data receiver circuit includes first and second interfaces coupled to first and second respective transmission lines. The first and second respective transmission lines comprise a first pair of transmission lines external to the data receiver circuit. The first and second interfaces receive a first transmission signal from the first pair of transmission lines. The data receiver circuit also includes third and fourth interfaces coupled to third and fourth respective transmission lines. The third and fourth respective transmission lines comprise a second pair of transmission lines external to the data receiver circuit. The third and fourth interfaces receive a second transmission signal from the second pair of transmission lines. First and second common mode extraction circuits extract respective first and second common-mode clock signals from the respective first and second transmission signals. The first extracted clock signal has a first polarity and the second extracted clock signal has a second polarity opposite to the first polarity. A combiner combines the first and second extracted clock signals into a single sampling clock signal. First and second differential mode circuits extract respective first and second differential-mode data signals from the respective first and second transmission signals. The first and second differential mode circuits are synchronized to the sampling clock signal.

In some embodiments, a data transmission circuit includes first and second interfaces coupled to first and second respective transmission lines. The first and second respective transmission lines comprise a pair of transmission lines external to the data transmission circuit. A data driver and a clock driver are coupled to the first and second interfaces. The data driver obtains a data signal and drives the data signal onto the pair of transmission lines in a differential mode. The clock driver obtains a clock signal and drives the clock signal onto the pair of transmission lines in a common mode. The data signal and the clock signal are driven onto the pair of transmission lines simultaneously and the data signal has a symbol rate corresponding to a frequency of the clock signal.

In some embodiments, a data transmission circuit includes first and second interfaces coupled to first and second respective transmission lines. The first and second respective transmission lines comprise a first pair of transmission lines external to the data transmission circuit. The data transmission circuit also includes third and fourth interfaces coupled to third and fourth respective transmission lines. The third and fourth respective transmission lines comprise a second pair of transmission lines external to the data transmission circuit. A first data driver obtains a first data signal and drives the first data signal onto the first pair of transmission lines in a differential mode. A second data driver obtains a second data signal and drives the second data signal onto the second pair of transmission lines in a differential mode. A clock driver is coupled to the first and second pairs of transmission lines. The clock driver obtains an input clock signal and drives a first output clock signal onto the first pair of transmission lines in a common mode and a second output clock signal onto the second pair of transmission lines in a common mode. The first output clock signal has a first polarity and the second output clock signal has a second polarity opposite to the first polarity. The first data signal, the second data signal, the first output clock signal, and the second output clock signal are driven onto the transmission lines simultaneously.

In some embodiments, a method of receiving data includes receiving a transmission signal from a pair of transmission lines, extracting a common-mode clock signal from the received transmission signal, extracting a differential-mode data signal from the received transmission signal, and sampling the extracted data signal. The extracted data signal has a symbol rate corresponding to a frequency of the extracted clock signal. The sampling is synchronized to the extracted clock signal.

In some embodiments, a method of receiving data includes receiving a first transmission signal from a first pair of transmission lines, receiving a second transmission signal from a second pair of transmission lines, extracting respective first and second common-mode clock signals from the respective first and second transmission signals, and combining the first and second extracted clock signals into a single sampling clock signal. The first extracted clock signal has a first polarity and the second extracted clock signal has a second polarity opposite to the first polarity. The method further includes extracting respective first and second differential-mode data signals from the respective first and second transmission signals and sampling the respective first and second extracted data signals. The sampling is synchronized to the sampling clock signal.

In some embodiments, a method of transmitting data includes driving a data signal onto a pair of transmission lines in a differential mode and driving a clock signal onto the pair of transmission lines in a common mode. The data signal and the clock signal are driven onto the pair of transmission lines simultaneously. The data signal has a symbol rate corresponding to a frequency of the clock signal.

In some embodiments, a method of transmitting data includes driving a first data signal onto a first pair of transmission lines in a differential mode; driving a second data signal onto a second pair of transmission lines in a differential mode; driving a first output clock signal onto the first pair of transmission lines in a common mode; and driving a second output clock signal onto the second pair of transmission lines in a common mode. The first output clock signal has a first polarity and the second output clock signal has a second polarity opposite to the first polarity. The first data signal, the second data signal, the first output clock signal, and the second output clock signal are driven onto the transmission lines simultaneously.

In some embodiments, a data receiver circuit includes means for receiving a transmission signal from a pair of transmission lines, means for extracting a common-mode clock signal from the received transmission signal, means for extracting a differential-mode data signal from the received transmission signal, and means for sampling the extracted data signal. The extracted data signal has a symbol rate corresponding to a frequency of the extracted clock signal. The means for sampling the extracted data signal is synchronized to the extracted clock signal.

In some embodiments, a data receiver circuit includes means for receiving a first transmission signal from a first pair of transmission lines, means for receiving a second transmission signal from a second pair of transmission lines, and means for extracting respective first and second common-mode clock signals from the respective first and second transmission signals. The first extracted clock signal has a first polarity and the second extracted clock signal has a second polarity opposite to the first polarity. The data receiver circuit also includes means for combining the first and second extracted clock signals into a single sampling clock signal, means for extracting respective first and second differential-mode data signals from the respective first and second transmission signals, and means for sampling the respective first and second extracted data signals. The means for sampling the respective first and second extracted data signals is synchronized to the sampling clock signal.

In some embodiments, a data transmission circuit includes means for driving a data signal onto a pair of transmission lines in a differential mode and means for driving a clock signal onto the pair of transmission lines in a common mode. The data signal and the clock signal are driven onto the pair of transmission lines simultaneously. The data signal has a symbol rate corresponding to a frequency of the clock signal.

In some embodiments, a data transmission circuit includes means for driving a first data signal onto a first pair of transmission lines in a differential mode; means for driving a second data signal onto a second pair of transmission lines in a differential mode; means for driving a first output clock signal onto the first pair of transmission lines in a common mode; and means for driving a second output clock signal onto the second pair of transmission lines in a common mode. The first output clock signal has a first polarity and the second output clock signal has a second polarity opposite to the first polarity. The first data signal, the second data signal, the first output clock signal, and the second output clock signal are driven onto the transmission lines simultaneously.

In some embodiments, a computer readable medium contains circuit description data that, when operated on by a circuit compiler program being executed by a processor, synthesizes a data receiver circuit. The data receiver circuit includes first and second interfaces coupled to first and second respective transmission lines that comprise a pair of transmission lines external to the data receiver circuit. The first and second interfaces receive a transmission signal from the pair of transmission lines. The data receiver circuit also includes a common mode extraction circuit coupled to the first and second interfaces to extract a common-mode clock signal from the received transmission signal, a differential mode extraction circuit coupled to the first and second interfaces to extract a differential-mode data signal from the received transmission signal, and a sampling circuit to sample the extracted data signal. The extracted data signal has a symbol rate corresponding to a frequency of the extracted clock signal. The sampling circuit is synchronized to the extracted clock signal.

In some embodiments, a computer readable medium contains circuit description data that, when operated on by a circuit compiler program being executed by a processor, synthesizes a data receiver circuit. The data receiver circuit includes first and second interfaces coupled to first and second respective transmission lines that comprise a first pair of transmission lines external to the data receiver circuit. The first and second interfaces receive a first transmission signal from the first pair of transmission lines. The data receiver circuit also includes third and fourth interfaces coupled to third and fourth respective transmission lines that comprise a second pair of transmission lines external to the data receiver circuit. The third and fourth interfaces receive a second transmission signal from the second pair of transmission lines. The data receiver circuit further includes first and second common mode extraction circuits to extract respective first and second common-mode clock signals from the respective first and second transmission signals, a combiner to combine the first and second extracted clock signals into a single sampling clock signal, first and second differential mode extraction circuits to extract respective first and second differential-mode data signals from the respective first and second transmission signals, and first and second sampling circuits to sample the respective first and second extracted data signals. The first extracted clock signal has a first polarity and the second extracted clock signal has a second polarity opposite to the first polarity. The first and second sampling circuits are synchronized to the sampling clock signal.

In some embodiments, a computer readable medium contains circuit description data that, when operated on by a circuit compiler program being executed by a processor, synthesizes a data transmission circuit that includes first and second interfaces coupled to first and second respective transmission lines that comprise a pair of transmission lines external to the data transmission circuit. The data transmission circuit also includes a data driver coupled to the first and second interfaces, wherein the data driver obtains a data signal and drives the data signal onto the pair of transmission lines in a differential mode, and a clock driver coupled to the first and second interfaces, wherein the clock driver obtains a clock signal and drives the clock signal onto the pair of transmission lines in a common mode. The data signal and the clock signal are driven onto the pair of transmission lines simultaneously. The data signal has a symbol rate corresponding to a frequency of the clock signal.

In some embodiments, a computer readable medium contains circuit description data that, when operated on by a circuit compiler program being executed by a processor, synthesizes a data transmission circuit. The data transmission circuit includes first and second interfaces coupled to first and second respective transmission lines that comprise a first pair of transmission lines external to the data transmission circuit, and third and fourth interfaces coupled to third and fourth respective transmission lines that comprise a second pair of transmission lines external to the data transmission circuit. The data transmission circuit also includes a first data driver to obtain a first data signal and drive the first data signal onto the first pair of transmission lines in a differential mode, a second data driver to obtain a second data signal and drive the second data signal onto the second pair of transmission lines in a differential mode, and a clock driver coupled to the first pair of transmission lines and to the second pair of transmission lines. The clock driver obtains an input clock signal and drives a first output clock signal onto the first pair of transmission lines in a common mode and a second output clock signal onto the second pair of transmission lines in a common mode. The first output clock signal has a first polarity and the second output clock signal has a second polarity opposite to the first polarity. The first data signal, the second data signal, the first output clock signal, and the second output clock signal are driven onto the transmission lines simultaneously.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Multiple signals, such as a data signal and a clock signal, may be transmitted simultaneously over a channel, such as a transmission line or a pair of transmission lines. In some embodiments, a first signal is transmitted differentially over a pair of transmission lines and a second signal is simultaneously transmitted over the pair of transmission lines in a common mode. For example, a clock signal is transmitted in a common mode and a data signal is simultaneously transmitted differentially, where the data signal has a symbol rate corresponding to the frequency of the clock signal. Examples of correspondence between the symbol rate and the clock frequency include single-data-rate signaling (SDR), in which the symbol rate equals the clock frequency, and double-data-rate (DDR) signaling, in which the symbol rate is twice the clock frequency but the data has a Nyquist frequency equal to that of the clock; other ratios are possible. Differential and common-mode signaling are discussed further with regard to FIGS. 1A and 1B, below. In some embodiments, the clock signal is transmitted when data is transmitted and is otherwise deactivated. In some embodiments, the clock signal can be replaced by a strobe signal.

In differential signaling, a first transmission line in a pair of transmission lines carries a signal and a second transmission line in the pair carries the inverse of the signal. The inverse of the signal has an equal magnitude and an opposite polarity to the signal. The sum of the voltages on the two transmission lines corresponding to the two signals is constant. A signal transmitted using differential signaling is herein referred to as a differential-mode signal.

FIG. 1A is a schematic illustration of differential-mode signaling in accordance with some embodiments. A differential-mode signal 100 includes a first signal 102 transmitted on a first transmission line and a second signal 104 transmitted on a second transmission line. The second signal 104 has an equal magnitude (or a substantially equal magnitude if the circuits producing the two signals are not perfectly matched) and an opposite polarity to the first signal 102. At the end of the transmission lines, a combiner 106 extracts the transmitted signal by taking the difference of the first signal 102 and the second signal 104, producing an extracted signal 108.

In some embodiments, a pair of transmission lines that transmits a differential mode signal simultaneously transmits a common-mode signal. In common-mode signaling, the same signal is transmitted over both transmission lines in the pair.

FIG. 1B is a schematic illustration of common-mode signaling in accordance with some embodiments. A common-mode signal 120 includes a first signal 122 transmitted on a first transmission line and a second signal 124 transmitted on a second transmission line. The first signal 122 and the second signal 124 have equal magnitudes (or substantially equal magnitudes if the circuits producing the two signals are not perfectly matched) and equal polarities (i.e., the same polarity). At the end of the transmission lines, a combiner 126 extracts the transmitted signal by summing the first signal 122 and the second signal 124, producing an extracted signal 128.

Differential-mode and common-mode signals transmitted simultaneously over a pair of transmission lines can be independently extracted by a receiver. Taking the difference of the voltages on the two transmission lines (e.g., with a combiner 106) will cancel out a common-mode signal and extract a differential-mode signal. Summing the voltages on the two transmission lines (e.g., with a combiner 126) will cancel out a differential-mode signal and extract a common-mode signal.

In some embodiments, a pair of transmission lines that transmit differential-mode and/or common-mode signals are implemented as two or more traces on one or more printed circuit boards (e.g., a backplane link), two or more signal paths on a semiconductor device, or a channel in a network (e.g., an Ethernet network).

Figure 1D:
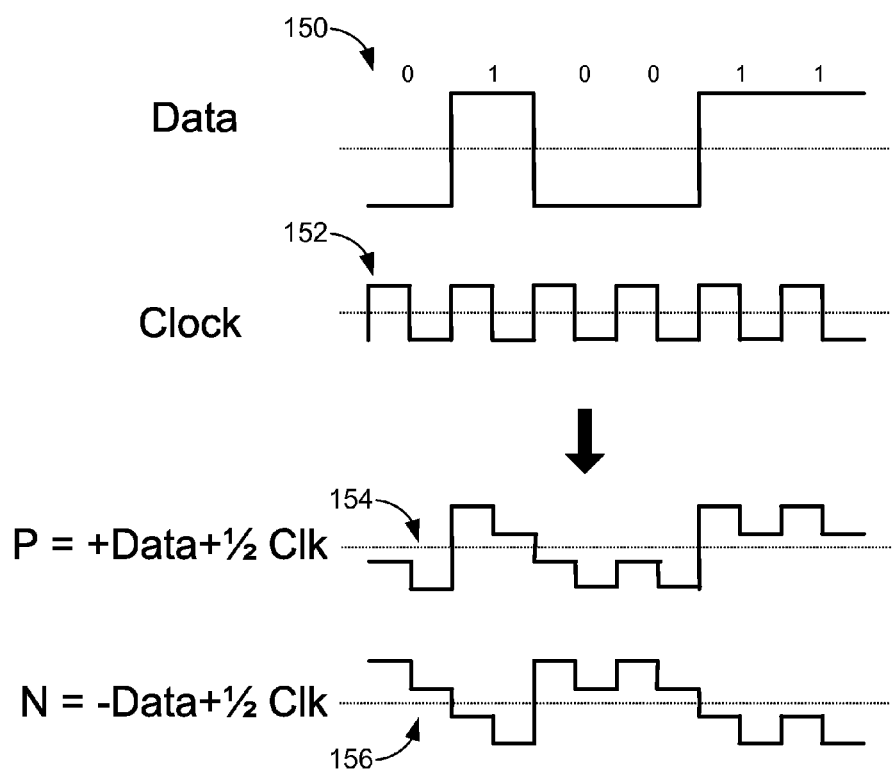

FIGS. 1C and 1D illustrate waveforms associated with simultaneously transmitting differential-mode and common-mode signals over a pair of transmission lines in accordance with some embodiments. In these examples, a data signal is transmitted differentially and a clock signal is transmitted in a common-mode; some implementations may choose other different signaling modes for clock and data separation, such as sending data in common mode and clock in differential mode. In FIG. 1C, a data waveform 140 corresponding to a particular polarity of a differential-mode data signal and a clock waveform 142 corresponding to a common-mode clock signal have equal amplitudes. The differential-mode data signal and common-mode clock signal are simultaneously driven onto the pair of transmission lines, resulting in a waveform 144 on the first transmission line and a waveform 146 on the second transmission line. A receiver can recover the clock and data waveforms 140 and 142, as described below.

In FIG. 1D, a data waveform 150 corresponding to a particular polarity of a differential-mode data signal has twice the amplitude of a clock waveform 152 corresponding to a common-mode clock signal. The differential-mode data signal and common-mode clock signal are simultaneously driven onto the pair of transmission lines, resulting in a waveform 154 on the first transmission line and a waveform 156 on the second transmission line. (Waveforms 154 and 156 are not drawn to scale with respect to waveforms 150 and 152). In FIGS. 1C and 1D data transitions are phase-aligned to rising clock edges. Generally, however, data transitions and rising clock edges may be pre-skewed by an amount that is convenient for the receive device. FIGS. 1C and 1D are examples of different amplitude ratios between transmitted differential and common-mode signals. It follows from examples 1C and 1D that the ratio of the differential and common-mode signal may be selected to have some fractional amplitude relationship with the possibility of either signal being the larger, as conditions dictate.

FIG. 2A is a block diagram of a data communications system 200 in accordance with some embodiments. The data communications system 200 includes a transmitter 202, a pair of transmission lines 204, and a receiver 206.

The transmitter 202 obtains for transmission a data signal 208 and a clock signal 210. For example, the transmitter 202 may receive a data stream comprising the data signal 208 from another device or circuit, or may retrieve data from one or more memory devices or memory arrays to as to obtain the data signal 208. A clock driver 218 drives the clock signal via interfaces 219 onto the pair of transmission lines 204 in a common mode. Simultaneously, a data driver 216 drives the data signal via interfaces 219 onto the pair of transmission lines 204 in a differential mode with a symbol rate corresponding to the clock signal frequency. In some embodiments, the clock driver 218 and/or the data driver 216 are line drivers, such as digital-to-analog converters (DACs) (e.g., zero-order hold DACs). In some embodiments, the path between the clock driver 218 and the pair of transmission lines 204 includes termination resistors 220. In some embodiments, the interfaces 219 include pins, balls, or other electrical contacts on a semiconductor package.

In some embodiments, a phase adjuster 214 receives the clock signal 210 and provides a phase-adjusted clock signal to a data retimer 212. The data retimer 212 receives the data signal 208 and provides the data signal to the data driver 216 at a symbol rate corresponding to the clock signal frequency. In some embodiments, the phase adjuster 214 is a phase interpolator. In some embodiments, the phase adjuster 214 is a phase-locked loop (PLL), a delay-locked loop (DLL), a voltage controlled delay line (VCDL), or other timing adjustment circuit.

In some embodiments, the data driver and clock driver have programmable drive strengths, as shown for data driver 254 and clock driver 256 of transmitter 252 in data communications system 250 (FIG. 2C). In some embodiments, the drive strengths (and corresponding output swings) for the data driver 254 and the clock driver 256 are adjustable and may sum to a fixed total drive strength: if the data driver 254 has a drive strength of a, the clock driver 256 has a normalized drive strength of 1−α, assuming a normalized total drive strength of 1. The combined output swing of the data driver 254 and clock driver 256 thus remains substantially constant and the respective drive strengths of the data driver 254 and the clock driver 256 can be traded off against each other. In some embodiments, the output swings of the data driver 254 and clock driver 256 may be simultaneously increased or reduced to optimize the reception of the final data signal, as long as the combined output swing of the drivers remains less than or equal to the fixed total drive strength. Increasing the drive strength of the clock driver 256 improves reception of the clock signal by the receiver 206, reducing jitter for reception of the data signal. Increasing the drive strength of the data driver 254 improves reception of the data signal by the receiver 206 by improving voltage swing.

The receiver 206 receives via interfaces 221 a transmission signal that includes the differential-mode data signal and the common-mode clock signal. In some embodiments, the interfaces 221 include pins, balls, or other electrical contacts on a semiconductor package. A differential mode extraction circuit 226 extracts the differential-mode data signal from the received transmission signal. The extracted data signal is provided to a sampling circuit 236 that samples the extracted data signal. The combination of the differential mode extraction circuit 226 and the sampling circuit 236 is an example of a differential mode circuit 238 for a receiver.

A common mode extraction circuit 228 extracts the common-mode clock signal from the received transmission signal. In some embodiments, the common mode extraction circuit 228 includes buffers 230 and a combiner 232. The extracted clock signal is provided to the sampling circuit 236 via an optional limiting amplifier 234 which can reduce the voltage and timing noise. In some embodiments, the common mode extraction circuit 228 includes a band-pass filter, such as an LC network with a resonant peak substantially centered on the clock signal frequency. In some embodiments the common mode extraction circuit may include a resistor divider.

In some embodiments, a limit amplifier 234, also referred to as a clipping amplifier, amplifies the extracted clock signal and provides the amplified clock signal to the sampling circuit 236. In some embodiments a timing circuit receives the extracted clock signal and provides a clock signal to the sampling circuit 236. In some embodiments, the timing circuit includes a PLL 244 (receiver 242; FIG. 2B) or a DLL (not shown). In some embodiments, the timing circuit includes a phase interpolator (not shown).

In some embodiments, the receiver 206 includes buffers 222 to isolate the receiver circuitry from the pair of transmission lines 204. In some embodiments, termination resistors 224 terminate the pair of transmission lines 204. Each of the termination resistors 224 may be coupled at one end to a termination voltage source $V_{TT}$, and at the other end to a respective transmission line 204.

Figure 3A:
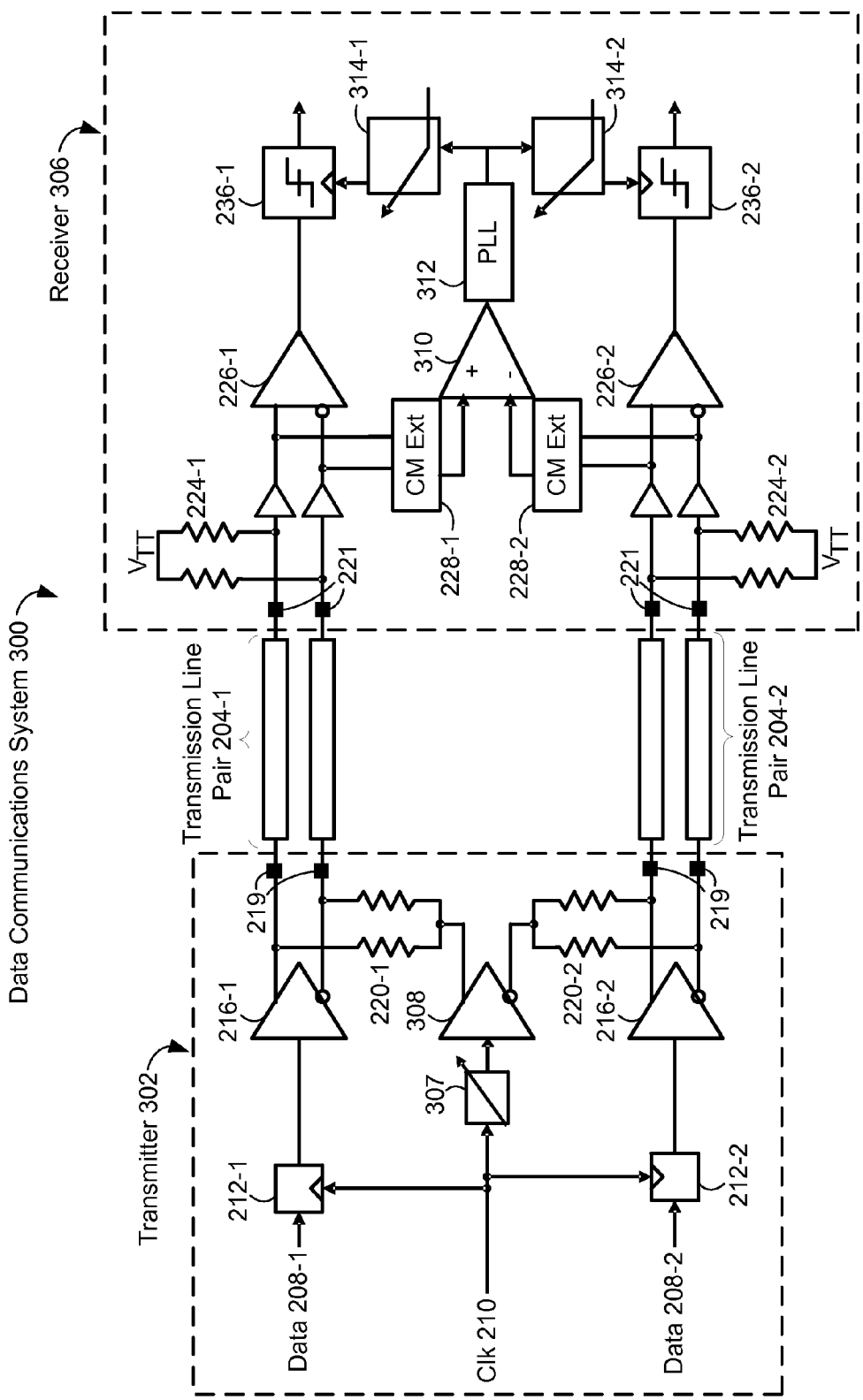
FIGS. 3A-3D are block diagrams of a data communications system in accordance with some embodiments.
Figure 3B:
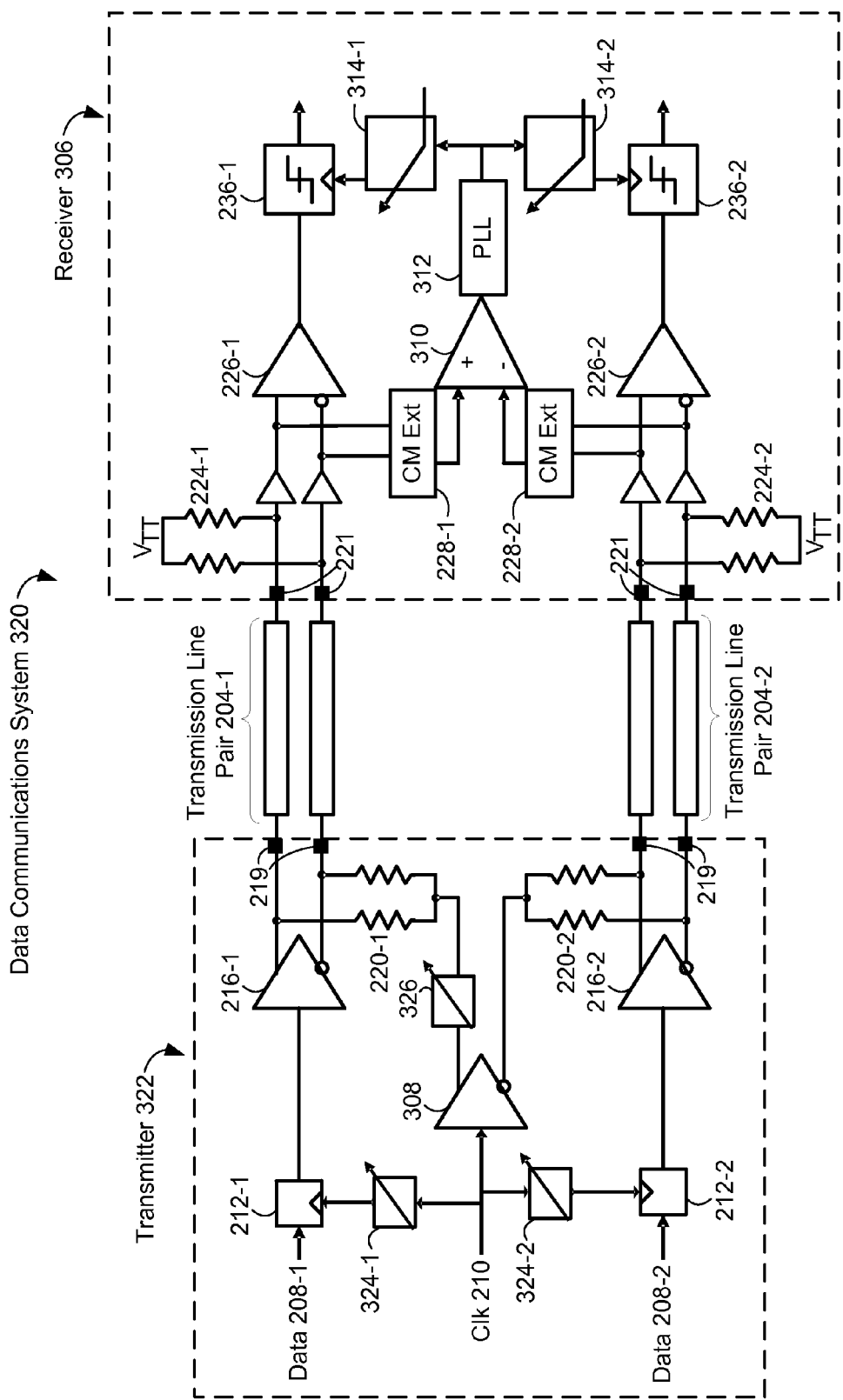
Figure 3C:
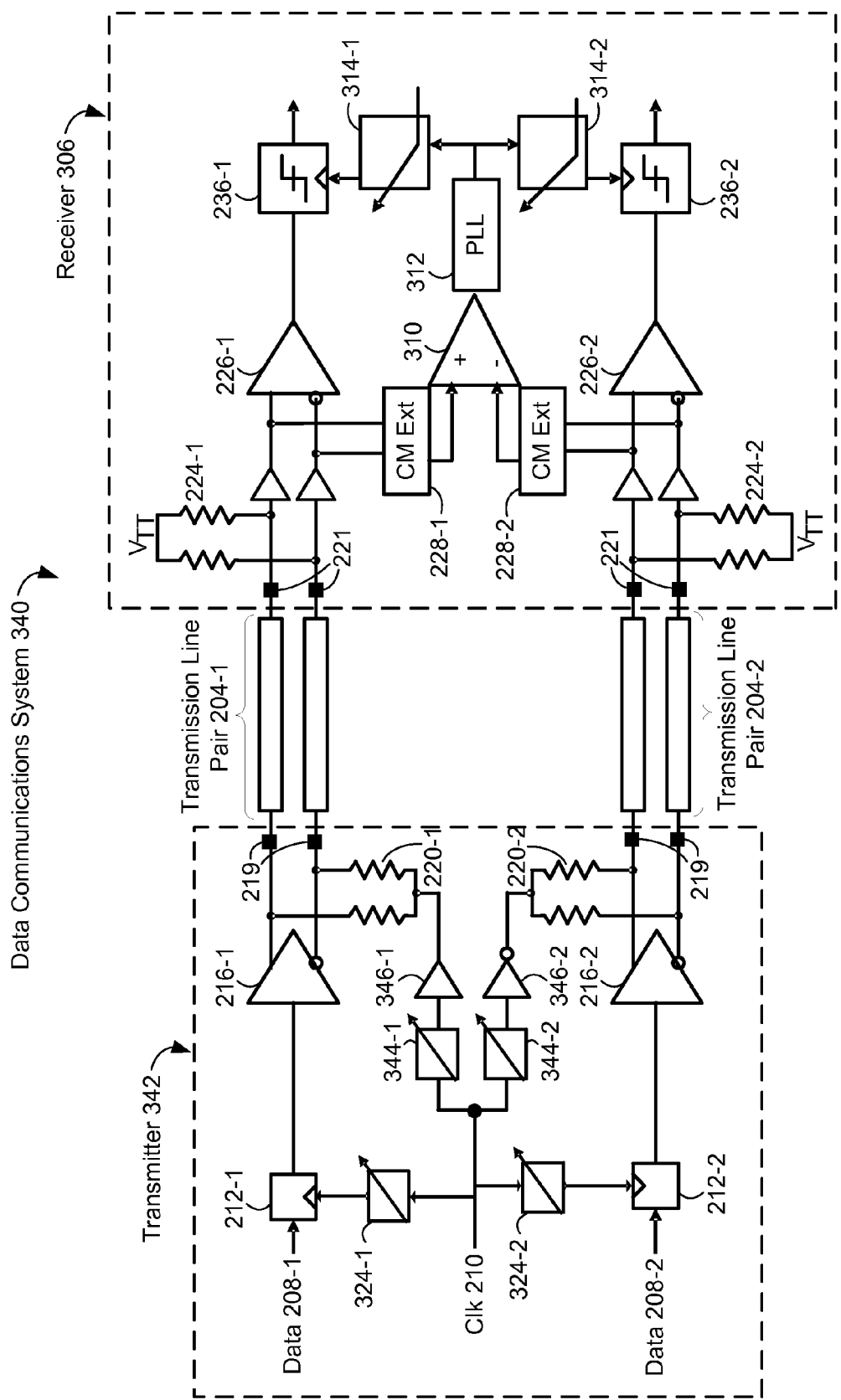
Figure 3D:
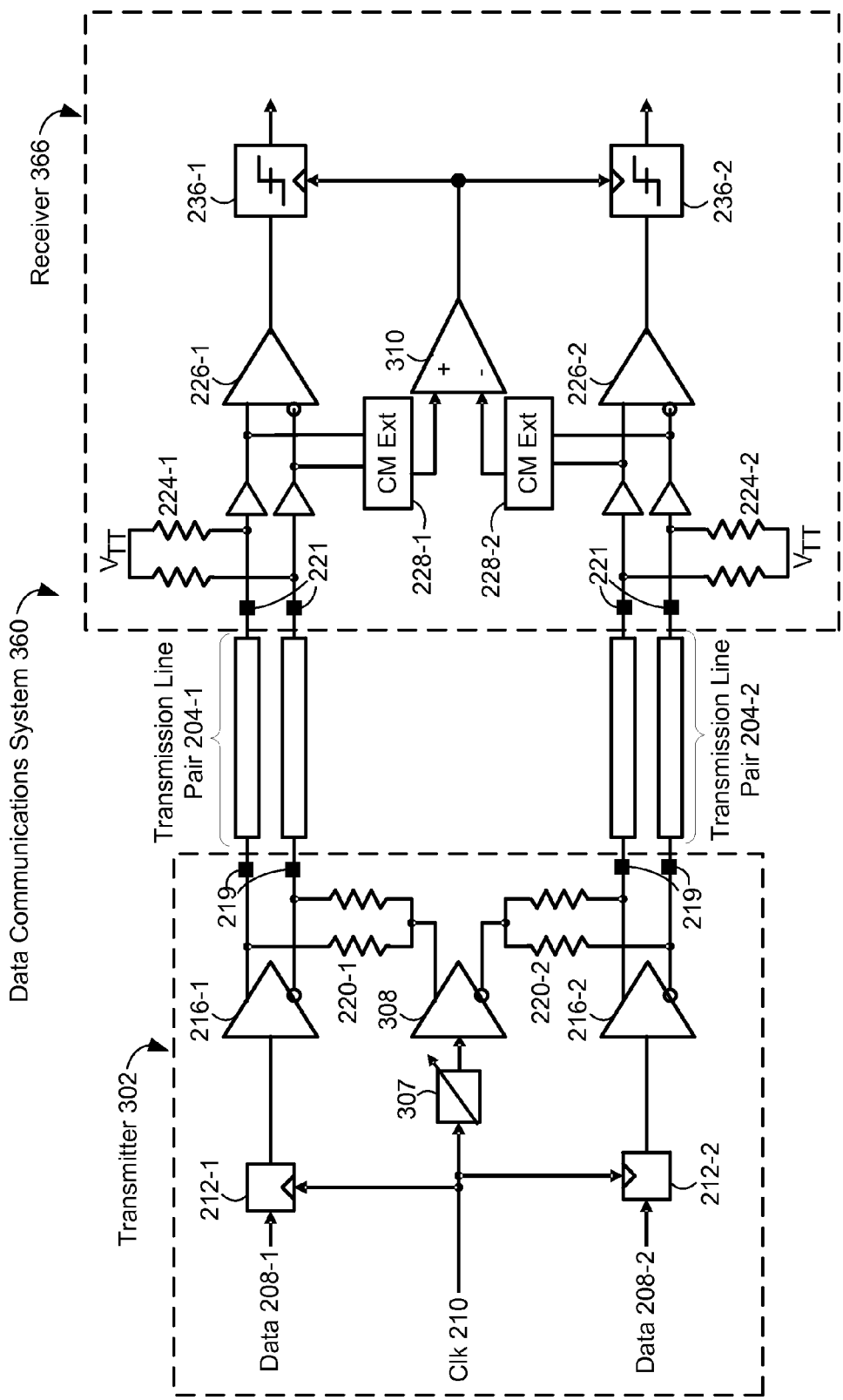
Figure 3E:
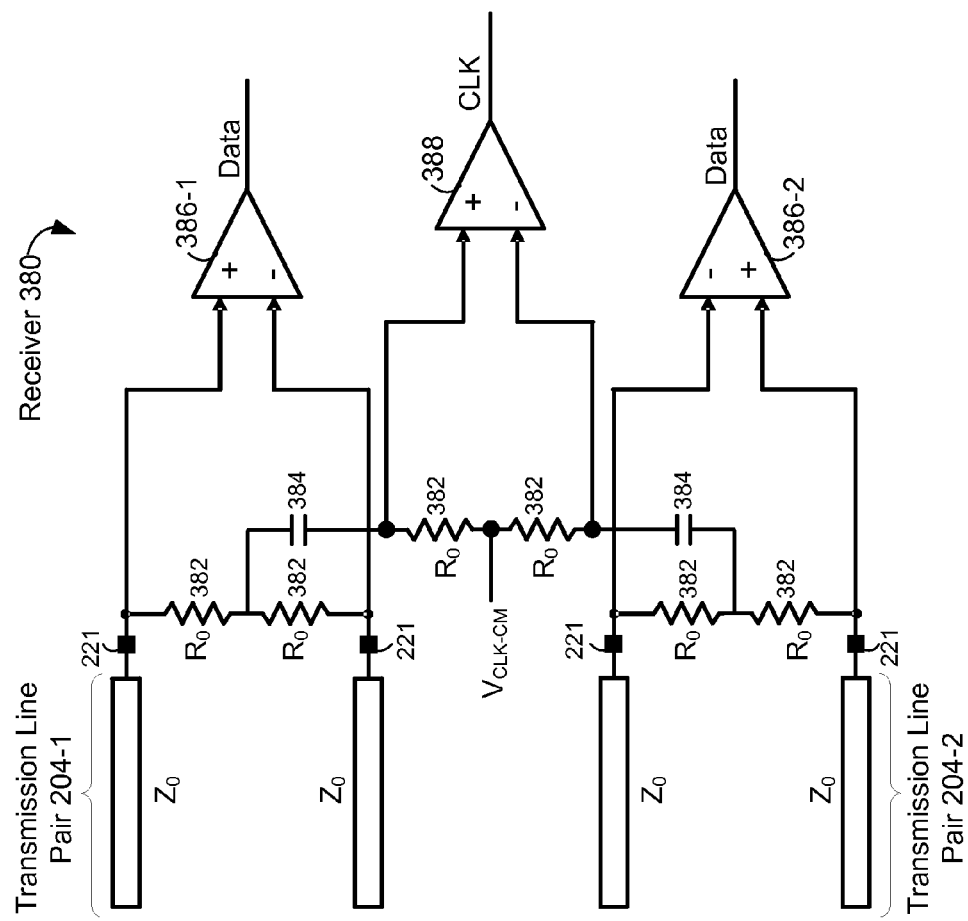
FIG. 3E is a circuit diagram illustrating circuitry within a receiver in accordance with some embodiments.
Figure 3F:
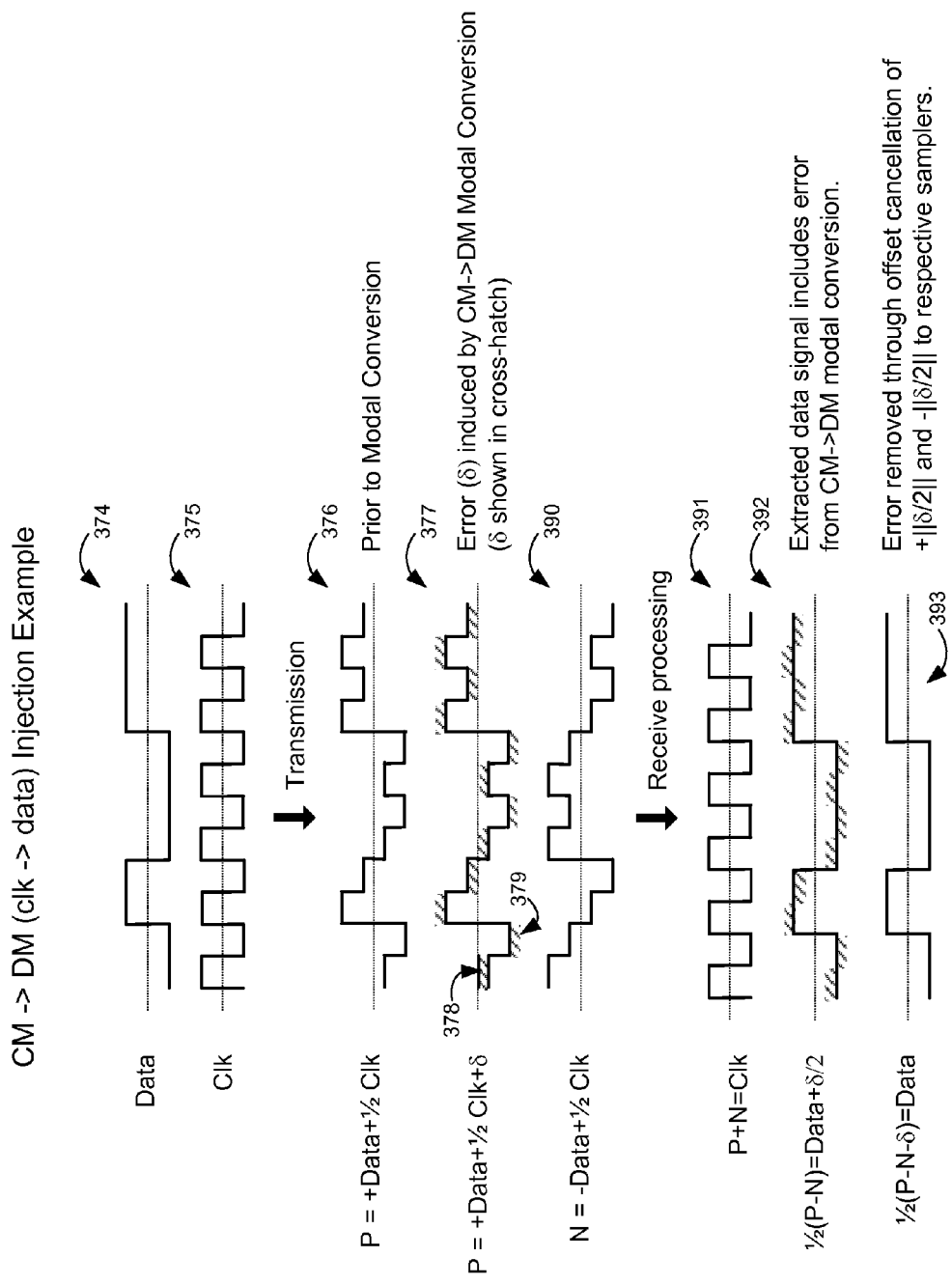
FIG. 3F illustrates waveforms associated with common mode-to-differential mode conversion in accordance with some embodiments.
Figure 3G:
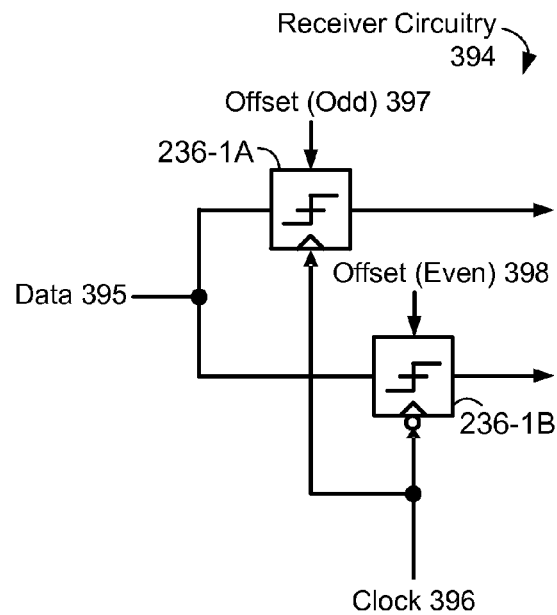
FIG. 3G is a block diagram illustrating circuitry within a receiver in accordance with some embodiments.

While the receiver 206 is shown as having a single sampling circuit 236, in some embodiments the receiver may include two or more sampling circuits to accommodate DDR signaling, as illustrated in FIG. 3G in accordance with some embodiments.

In some embodiments, a differential sampling circuit 284 in a receiver 282 performs both the differential mode extraction and data sampling operations, as illustrated in FIG. 2F in accordance with some embodiments. The differential sampling circuit 284 replaces the differential mode extraction circuit 226 and the sampling circuit 236 of receiver 206 (FIG. 2A or 2C). Similarly, in some embodiments the differential sampling circuit 284 could replace the differential mode extraction circuit 226 and the sampling circuit 236 of receiver 242 (FIG. 2B). The differential sampling circuit 284 is an example of a differential mode circuit for a receiver.

FIG. 2D is a high-level block diagram of a receiver 260 in accordance with some embodiments. The receiver 260, like receivers 206 (FIG. 2A) and 242 (FIG. 2B), simultaneously receives a differential-mode (DM) signal and a common-mode (CM) signal via the transmission line pair 204. DM extraction circuit 262 extracts the differential-mode signal and provides the extracted DM signal to the sampling circuit 236. CM extraction circuit 264 extracts the common-mode signal and provides the extracted CM signal to a bandpass filter 266, which filters the extracted CM signal. The filtered signal is provided as a clock to the sampling circuit 236.

FIGS. 2A-2D illustrate examples of data communications systems in which a data signal is transmitted in a differential mode over a pair of transmission lines simultaneously with a clock signal transmitted in a common mode over the pair of transmission lines. In some embodiments, however, a data communications system may transmit a data signal in a common mode over a pair of transmission lines simultaneously with a clock signal transmitted in a differential mode over the pair of transmission lines. A transmitter for such a system could be implemented by modifying a transmitter 202 (FIGS. 2A-2B) or 252 (FIG. 2C) such that the clock driver 218 (FIGS. 2A-2B) or 256 (FIG. 2C) is instead used to drive data and the data driver 216 (FIGS. 2A-2B) or 254 (FIG. 2C) is used to drive the clock. A block diagram of a receiver 270 for such a system is illustrated in FIG. 2E in accordance with some embodiments. The receiver 270, like the receiver 260 (FIG. 2D), simultaneously receives a differential-mode (DM) signal and a common-mode (CM) signal via the transmission line pair 204. In the receiver 270, however, the CM extraction circuit 264 extracts the CM signal and provides the extracted CM signal to the sampling circuit 236 as a data signal to be sampled. The DM extraction circuit 262 extracts the DM signal and provides the extracted DM signal to a bandpass filter 266, which filters the extracted DM signal. The filtered signal is provided as a clock to the sampling circuit 236.

In some embodiments, a first pair of transmission lines transmits a first common-mode clock signal and a second pair of transmission lines transmits a second common-mode clock signal. The first and second common-mode clock signals have opposite polarities. Thus, taken together, the first and second common-mode clock signals provide a single differential clock signal.

FIG. 3A is a block diagram of a data communications system 300 in accordance with some embodiments. The data communications system 300 includes a transmitter 302, two pairs of transmission lines 204, and a receiver 306. In some embodiments, the transmitter 302 simultaneously transmits a first differential-mode data signal and a first common-mode output clock signal on the first transmission line pair 204-1 and a second differential-mode data signal and a second common-mode output clock signal on the second transmission line pair 204-2. In some embodiments the first and second common-mode clock signals have opposite polarities and thus effectively provide a single differential clock signal to the receiver 306. This reduces the electromagnetic interference (EMI) caused by the transmission of the clock signal and provides a larger, differential clock signal for the receiver 306.

The transmitter 302 obtains for transmission data signals 208-1 and 208-2. The respective data signals 208 are provided to respective data retimers 212, which also obtain an input clock signal 210 and which provide the respective data signals 208 to respective data drivers 216 at a symbol rate corresponding to the input clock signal 210 frequency. The data drivers 216 drive the respective data signals 208 onto the respective transmission line pairs 204 at a symbol rate corresponding to the input clock signal 210 frequency.

The input clock signal 210 is provided to a clock driver 308, which drives the first common mode output clock signal onto the first pair 204-1 of transmission lines and the second common mode output clock signal onto the second pair 204-2 of transmission lines. In some embodiments, a phase adjuster 307 (in some embodiments, a phase offset vernier) adjusts the phase of the clock signal provided to the clock driver 308 to compensate for skew between the data drivers 216 and the clock driver 308. In some embodiments, the vernier phase offset is approximately 90 degrees.

Other skew compensation schemes may be implemented in the transmitter, as illustrated in FIGS. 3B-3C in accordance with some embodiments. In the data communication system 320 (FIG. 3B), phase adjusters 324-1 and 324-2 independently adjust the phases of respective clock signals provided to the data retimers 212-1 and 212-2. These adjustments allow for compensation of skews in the delay paths of the transmission line paths 204-1 and 204-2 as well as differences in the propagation speed between the differential and common modes. Adjustments made 'in common' to 324-1 and 324-2 will affect a skew relative to the common-mode clock driven by driver 308, whereas adjustments made 'in difference' between 324-1 and 324-2 will compensate for differences in path lengths between 204-1 and 204-2.

In addition, a phase adjuster 326 adjusts the phase of the clock signal driven by the clock driver 308 onto the first transmission line pair 204-1 and allows for compensation of any skews in the common-mode path between signal pair 204-1 and 204-2 so that by the time the clock signals are recombined in clock buffer 310 they have been deskewed.

Alternately, as illustrated for the data communication system 340 (FIG. 3C), separate clock drivers 346-1 and 346-2 drive clock signals onto corresponding transmission line pairs 204-1 and 204-2. Phase adjusters 344-1 and 344-2 independently adjust the phases of respective clock signals provided to the clock drivers 346-1 and 346-2. The data communication system 340 also includes the phase adjusters 324-1 and 324-2 to adjust the phases of respective clock signals provided to the data retimers 212-1 and 212-2.

The receiver 306 receives respective transmission signals from the first and second transmission line pairs 204-1 and 204-2 that each includes a differential-mode data signal and a common-mode clock signal. Differential mode extraction circuits 226 extract the differential-mode data signals from the transmission signals. The extracted data signals are provided to sampling circuits 236 that sample the extracted data signals. In some embodiments, a differential sampling circuit (e.g., 284, FIG. 2F) replaces each differential mode extraction circuit 226 and corresponding sampling circuit 236.

A common-mode extraction circuit 228 extracts the respective common-mode output clock signal from the respective transmission signal. The first and second extracted output clock signals, with opposite polarity, are provided to a combiner 310 that combines the extracted output clock signals into a single sampling clock signal. The sampling circuits 236-1 and 236-2 are synchronized to the sampling clock signal.

In some embodiments, the combiner 310 provides the sampling clock signal to a timing circuit. The timing circuit receives the sampling clock signal and provides a clock signal to the first 236-1 and second 236-2 sampling circuits. In some embodiments, the timing circuit includes a PLL 312 or a DLL (not shown). In some embodiments, the timing circuit includes a phase interpolator 314 coupled to the PLL and to a sampling circuit 236 to adjust the phase of the clock signal provided to the sampling circuit. In the embodiment shown in FIG. 3, optional phase interpolators 314-1 and 314-2 couple the PLL to sampling circuits 236-1 and 236-2, respectively, to adjust the phase of the clock signal provided to the sampling circuits. Optionally, the PLL 312 may also adjust the frequency of the sampling clock signal to match the symbol rate of the data signal.

In some embodiments, the combiner 310 provides the sampling clock signal to a clipping amplifier (not shown). The clipping amplifier amplifies the sampling clock signal and provides the amplified sampling clock signal to the sampling circuits 236.

Alternately, instead of providing the sampling clock signal to a timing circuit or to an amplifier, the combiner 310 provides the sampling clock signal directly to the sampling circuits 236-1 and 236-2, as illustrated for receiver 366 in FIG. 3D in accordance with some embodiments. Elimination of the clock retiming (PLL) circuits can be advantageous for high performance, low power applications in that it facilitates rapid turn on and turn off of clocks and data without having to wait for a PLL to relock or for clock recovery to reacquire. In the absence of receiver circuitry to adjust the sampling clock signal, clock adjustments are handled in the transmitter. For example, in the system 360 (FIG. 3D), the phase adjuster 307 adjusts the timing of clock signals transmitted by the clock driver 308 with respect to data signals transmitted by the data drivers 216. While the receiver 366 is illustrated as implemented in a system 360 with transmitter 302, the receiver 366 also may be implemented in a system with transmitter 322 (FIG. 3B), transmitter 342 (FIG. 3C), or another transmitter with a suitable scheme (e.g., phase adjusters 324-1 and 324-2, which independently adjust the phases of respective clock signals provided to the data retimers 212-1 and 212-2) for deskewing transmitted signals.

While the receivers 306 and 366 are shown as having a single sampling circuit 236 for each transmission line pair 204, in some embodiments the receiver may include two sampling circuits for each transmission line pair 204 to accommodate DDR signaling, as illustrated below in FIG. 3G in accordance with some embodiments.

FIG. 3E is a circuit diagram illustrating circuitry within a receiver 380 in accordance with some embodiments. The receiver 380 receives, from each of the two pairs of transmission lines 204-1 and 204-2, a signal that includes a differential-mode data signal and a common-mode clock signal. Each transmission line has a characteristic impedance $Z_0$, where $Z_0$ equals the resistance $R_0$ for the resistors 382 in the receiver 380. In some embodiments the RC network shown in FIG. 3E may not provide matched termination impedance for both the differential and common modes of the transmission line pairs. In some embodiments the common mode termination impedance may be intentionally unmatched in order to achieve good differential mode matching, since the differential mode data signals are more susceptible to inter-symbol interference cause by impedance mismatch reflections. Amplifiers 386-1 and 386-2 extract data signals from the received signals, while amplifier 388 extracts a single clock signal from the received signals. The extracted data signals are provided, for example, to sampling circuits (e.g., 236-1 and 236-2, FIG. 3A, 3B, 3C or 3D). The extracted clock signal may be provided to a timing circuit (e.g., 312) or may be provided directly to the sampling circuits.

The capacitors 384 reduce or minimize duty-cycle error on the clock signal. In some embodiments, the amplifiers 386 and/or 388 may be replaced with matched linear equalizers having substantially identical operating characteristics, which may have an additional benefit by reducing jitter amplification differences between clock and data. In some embodiments amplifiers 386 and/or 388 are omitted and their differential inputs may be used directly as inputs into a sampling circuit.

FIGS. 3A-3E describe embodiments in which two transmission line pairs are used to transmit a clock signal. In some embodiments, however, a clock signal is transmitted using more than two transmission line pairs. For example, a clock signal may be transmitted over four pairs of transmission lines, wherein positive polarities of the clock signal are transmitted over two of the pairs and negative polarities are transmitted over the remaining two pairs. In some embodiments, a single clock driver is used to drive the clock signal onto the multiple pairs of transmission lines, thus reducing the complexity of the transmitter circuitry. In some embodiments, the multiple pairs of transmission lines constitute a bus.

While differential-mode signals and common-mode signals transmitted simultaneously over a pair of transmission lines are theoretically independent, in practice modal conversion can occur. Modal conversion refers to the conversion into differential mode of a portion of the energy of a common-mode signal ("CM-to-DM conversion") or conversion into common mode of a portion of the energy of a differential mode signal ("DM-to-CM conversion"). The amount of modal conversion that occurs is a function of the signaling environment and may result, for example, from a combination of differential signal skew and variations of the characteristic impedance of a transmission line along the length of the transmission line or gaps in the return current path in stripline or microstrip traces.

If a clock signal is transmitted in common mode and a data signal is simultaneously transmitted in differential mode, then any CM-to-DM conversion will result in the clock interfering with the data. Because the clock signal is periodic, the resulting interference with the data is periodic (i.e., cyclostationary), as illustrated in the example shown in FIG. 3F in accordance with some embodiments. In FIG. 3F, a data signal 374 is driven onto a pair of transmission lines in differential mode and a clock signal 375 is simultaneously driven onto the pair of transmission lines in common mode. The resulting signals on the pair of transmission lines, prior to any modal conversion, include a positive-polarity signal ("P") 376 on the first transmission line and a negative-polarity signal ("N") 390 on the second transmission line. CM-to-DM modal conversion occurs during transmission, which induces an effective differential error in the P signal, resulting in a P signal 377. The error in the P signal 377 includes a positive offset 378 for odd data cycles and a negative offset 379 for even data cycles, as indicated by cross-hatching in FIG. 3F. A receiver extracts a clock signal 391 and a data signal 392 from the received P signal 377 and N signal 390. Error in the extracted data signal 392 is cancelled by performing offset cancellation in respective sampling circuits that sample respective odd and even data cycles. In this example a first sampling circuit cancels error in the extracted data signal 392 resulting from the positive offset 378 for odd data cycles and a second sampling circuit cancels error in the extracted data signal 392 resulting from the negative offset 379 for even data cycles. Removal of the error through offset cancellation is illustrated by data signal 393. While FIG. 3F shows the edges of the data signal 374 aligned to the edges of the clock signal 375, the edges need not be aligned; for example, the edges may be offset by approximately 90°. The resulting waveforms will vary according to the offset between the clock and data edges, but adverse effects from CM to DM conversion will be reduced using this technique.

Figure 7A:
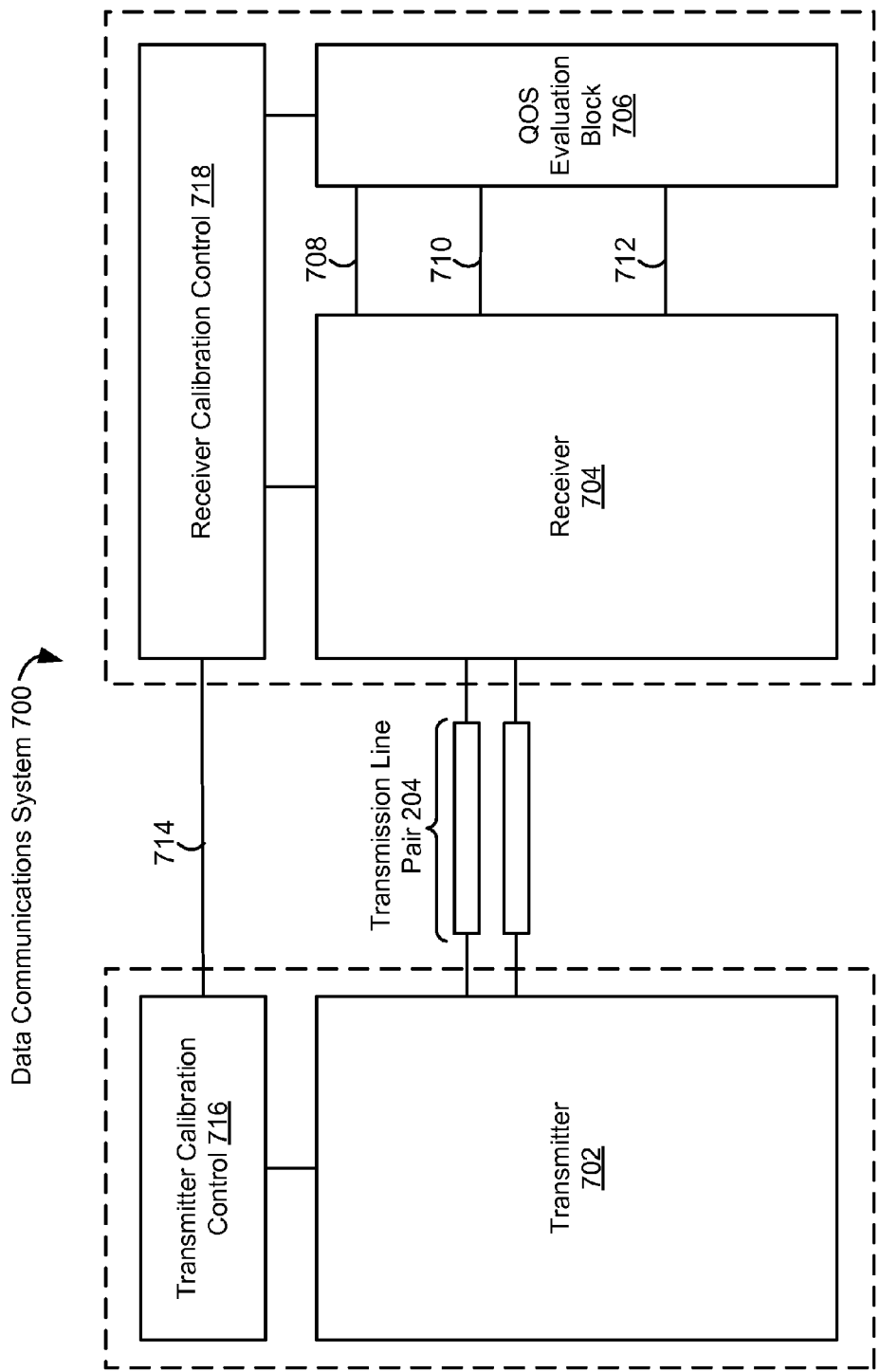
FIG. 7A is a block diagram of a data communications system including a Quality of Signal evaluation block in accordance with some embodiments.

FIG. 3G illustrates receiver circuitry 394 for performing offset cancellation in accordance with some embodiments. A DDR data signal 395, such as a data signal extracted by a differential mode extraction circuit 226 (FIGS. 2A-2C or 3A-3D), is provided to two sampling circuits 236-1A and 236-1B. The two sampling circuits 236-1A and 236-1B are synchronized to respective phases (e.g., positive and negative phases) of a clock signal 396, such as a clock signal extracted by a common mode extraction circuit 228 (FIGS. 2A-2C or 3A-3D) or provided by a locked loop circuit such as PLL 244 (FIG. 2B) or 312 (FIGS. 3A-3C), and sample the data signal 395 on respective odd and even data cycles. The first sampling circuit 236-1A applies a first voltage offset 397 to the data signal 395 to cancel the effect of CM-to-DM modal conversion for odd data cycles and the second sampling circuit 236-1B applies a second voltage offset 398 to cancel the effect of CM-to-DM modal conversion for even data cycles. In some embodiments, the first voltage offset 397 and second voltage offset 398 are substantially equal in magnitude and opposite in sign, allowing for a simplification of offset correction circuitry. In some embodiments, the offsets 397 and 398 are provided by receiver calibration control circuitry 718 (FIG. 7A) and determined by a QOS evaluation block 706 (FIG. 7A). For example, the offsets 397 and 398 may be determined through an offset cancellation loop.

Figure 3H:
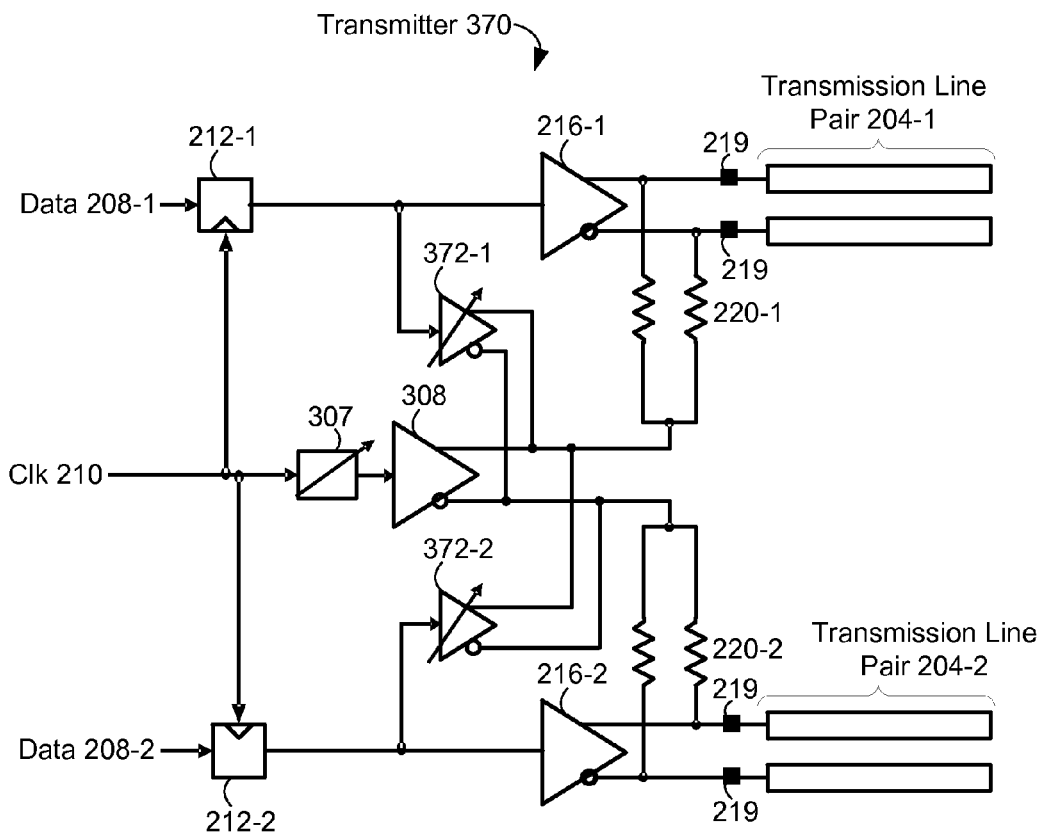
FIG. 3H is a block diagram of a transmitter in accordance with some embodiments.

DM-to-CM conversion for a differential-mode data signal transmitted simultaneously with a common-mode clock signal results in the data interfering with the clock, thereby increasing clock jitter. A transmitter may compensate for this interference by providing a cancellation signal to the clock signal. FIG. 3H illustrates a transmitter 370 that includes circuitry for offsetting DM-to-CM conversion in accordance with some embodiments. In addition to data drivers 216-1 and 216-2 and a clock driver 308 (FIG. 3A, 3B, or 3D), the transmitter 370 includes first and second cancellation drivers 372-1 and 372-2 to provide cancellation versions of the data to the clock signals driven by the clock driver 308. The first cancellation driver 372-1 superimposes the complement of the first data signal at a small fraction of its full amplitude onto the first and second common-mode clock signals to offset DM-to-CM conversion in the first transmission line pair 204-1. Simultaneously, the second cancellation driver 372-2 superimposes the complement of the second data signal at a small fraction of its full amplitude onto the first and second common-mode clock signals to offset DM-to-CM conversion in the second transmission line pair 204-2.

In some embodiments, the cancellation drivers 372-1 and 372-2 have programmable drive strengths and may be programmed, for example, based on feedback from receiver calibration control circuitry 718 (FIG. 7A) for a corresponding receiver. The drive strength of the first cancellation driver 372-1 is determined by calibrating transmission via the first transmission line pair 204-1 while transmission via the second transmission line pair 204-2 is quieted. The drive strength of the second cancellation driver 372-2 then is determined by calibrating transmission via the second transmission line pair 204-2 while transmission via the first transmission line pair 204-1 is quieted.

Transmitter 370 corresponds to the addition of cancellation driver 372-1 and 372-2 to transmitter 302 (FIG. 3A). Alternatively, cancellation drivers 372-1 and 372-2 may be added to transmitter 322 (FIG. 3B), transmitter 342 (FIG. 3C), or another transmitter with a suitable scheme for deskewing transmitted signals.

In some embodiments, one or more transmitters (e.g., 202, 252, 302, 322, 342, or 370) and one or more receivers (e.g., 206, 242, 260, 270, 282, 306, 366, or 380) may be implemented together in a single integrated circuit (i.e., on a single chip).

Figure 4A:
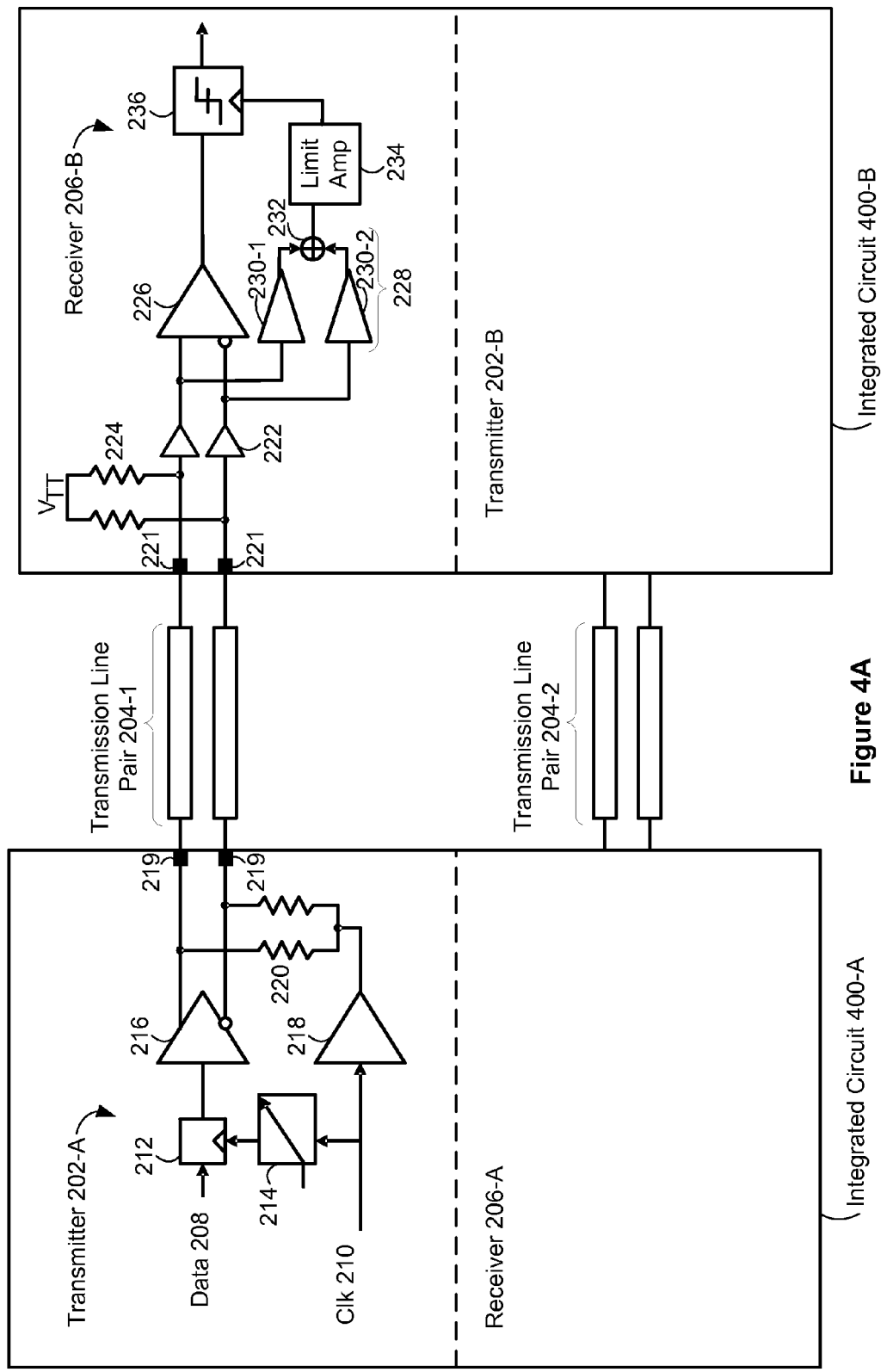
FIGS. 4A and 4B are block diagrams of two integrated circuits, each having a transmitter and a receiver, in accordance with some embodiments.
Figure 4B:
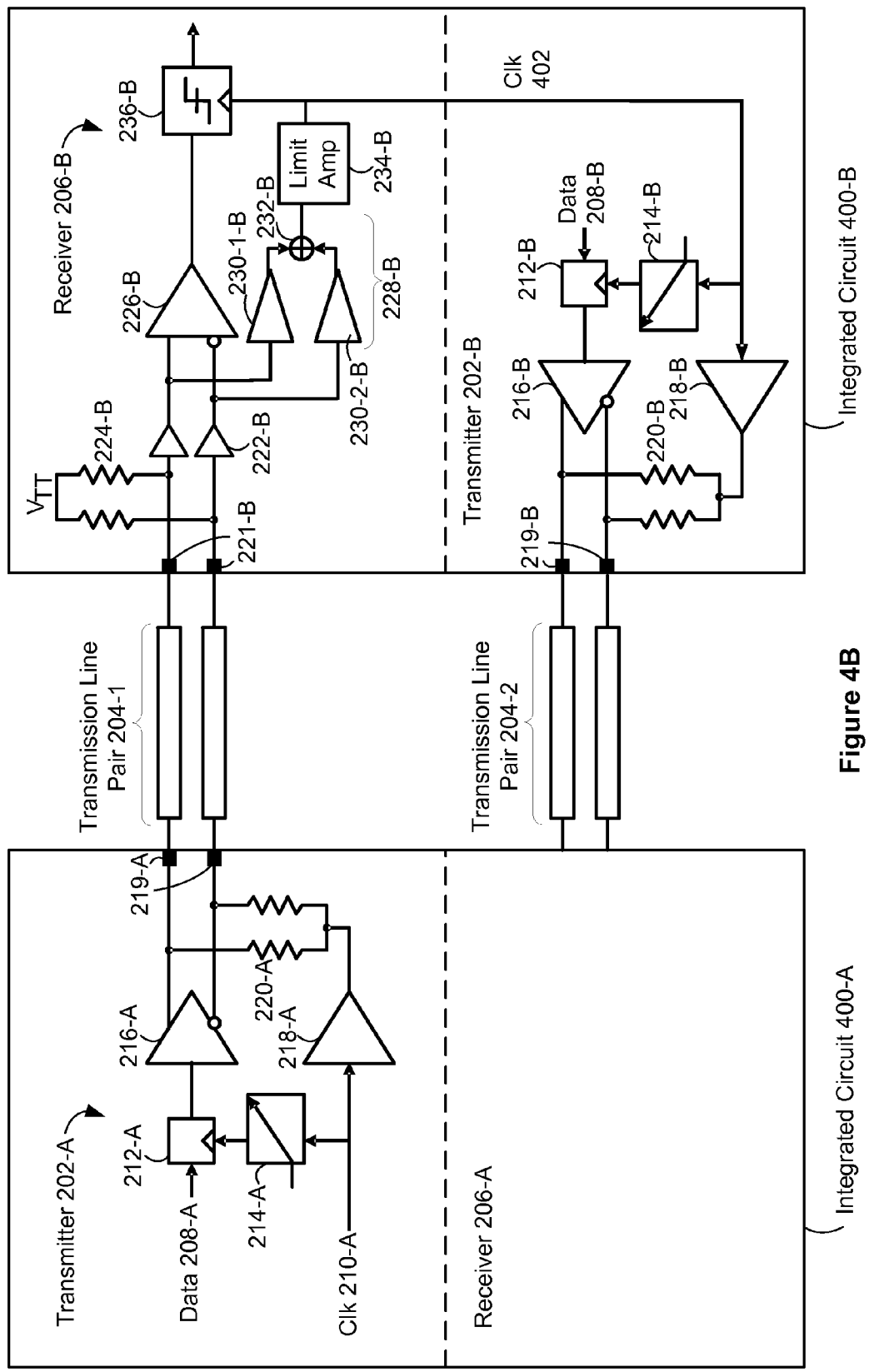

FIGS. 4A and 4B are block diagrams of two integrated circuits 400-A and 400-B, each having a transmitter 202 and a receiver 206, in accordance with some embodiments. Each transmitter 202 and each receiver 206 includes components described above with regard to FIGS. 2A and 2B. Integrated circuit 400-A may simultaneously transmit a differential-mode data signal and a common-mode clock signal to integrated circuit 400-B via a first pair of transmission lines 204-1 and may receive a transmission signal that includes a differential-mode data signal and a common-mode clock signal from integrated circuit 400-B via a second pair of transmission lines 204-2. Alternatively, integrated circuit 400-A may both transmit and receive signals via a single bidirectional channel (not shown).

In some embodiments, a clock signal 402 extracted by the receiver 206-B is provided to the transmitter 202-B of the same integrated circuit 400-B, thus sharing a clock signal between the receiver 206-B and the transmitter 202-B. Clock sharing between a receiver and a transmitter in an integrated circuit saves power by eliminating the need to generate a transmitter clock and further facilitates rapid transitions between powerdown and active high-performance states, and may be attractive in mobile applications such as cell phones, personal digital assistants (PDAs), and other portable devices.

In some embodiments, instead of a transmitter 202 and a receiver 206, each integrated circuit 400-A and 400-B has two transmitters 302 and two receivers 306 (FIG. 3).

In some embodiments, a data communications system such as those described with regard to FIGS. 2A-2C, 2F, or 3A-3D is implemented in a single integrated circuit to enable on-chip communications. In some embodiments, a data communications system such as those described with regard to FIGS. 2A-2C, 2F, or 3A-3D is implemented for chips in a stacked package configuration, thereby enabling communications between respective chips stacked in a package.

Attention is now directed to methods of transmitting and receiving data.

Figure 5A:
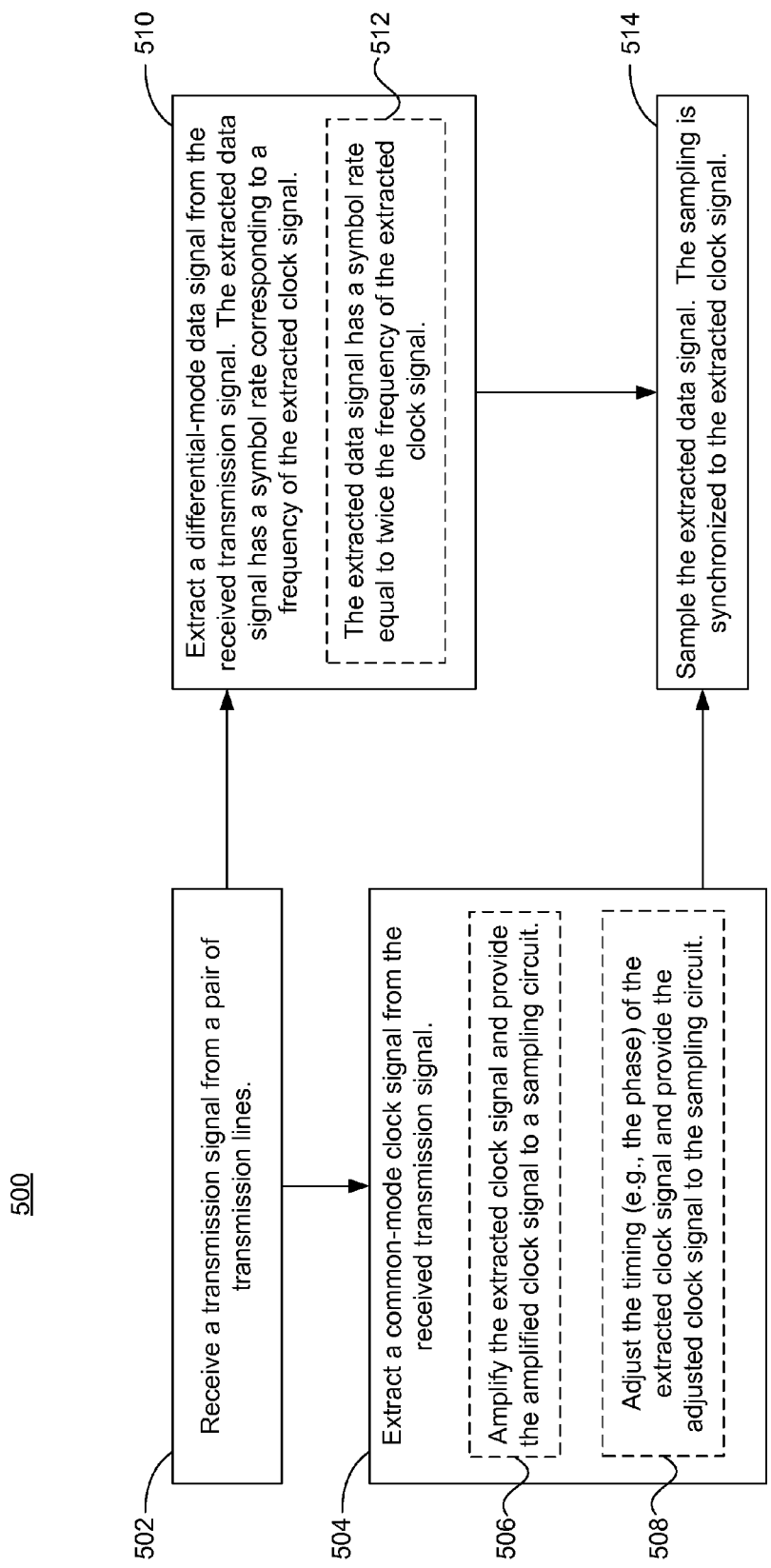
FIGS. 5A and 5B are flow diagrams illustrating a method of receiving data in accordance with some embodiments.

FIG. 5A is a flow diagram illustrating a method 500 of receiving data in accordance with some embodiments. While the method 500 described below includes operations that appear to occur in a specific order, it should be apparent that the method 500 can include more or fewer operations, that two or more of the operations can be performed in parallel, and that two or more operations can be combined into a single operation.

A transmission signal is received (502) from a pair of transmission lines. For example, the receiver 206 receives a transmission signal from a pair of transmission lines 204.

A common mode clock signal is extracted (504) from the received transmission signal. For example, the common mode extraction circuit 228 (FIGS. 2A-2C) extracts a common mode clock signal. In some embodiments, the extracted clock signal is amplified (506) (e.g., by a limit amplifier 234, FIG. 2A or 2C) and provided to a sampling circuit (e.g., 236). In some embodiments, the timing of the extracted clock signal is adjusted (508) and the adjusted clock signal is provided to the sampling circuit. For example, a PLL (e.g., 244, FIG. 2B) receives the extracted clock signal and provides a clock signal to the sampling circuit. In some embodiments, adjusting the timing of the extracted clock signal includes adjusting the phase of the extracted clock signal. For example, a phase interpolator adjusts the phase of the extracted clock signal and provides the phase-adjusted extracted clock signal to the sampling circuit.

A differential-mode data signal is extracted (510) from the received transmission signal. The extracted data signal has a symbol rate corresponding to a frequency of the extracted clock signal. For example, the differential mode extraction circuit 226 extracts a differential-mode data signal from the received transmission signal. In some embodiments, the extracted data signal has a symbol rate equal (512) to twice the frequency of the extracted clock signal.

The extracted data signal is sampled (514) (e.g., by the sampling circuit 236). The sampling is synchronized to the extracted clock signal. In some embodiments, synchronization of the sampling to the extracted clock signal is achieved by providing the amplified extracted clock signal to the sampling circuit. In some embodiments, synchronization of the sampling to the extracted clock signal is achieved by providing a clock signal output by a PLL (e.g., 244) or by a DLL to the sampling circuit, wherein the input to the PLL or to the DLL is the extracted clock signal. In some embodiments, synchronizing the sampling to the extracted clock signal includes adjusting the phase of the clock signal provided to the sampling circuit. In some embodiments, as shown in FIGS. 2A and 2B, the extracted data signal and the extracted clock signal are extracted simultaneously.

Figure 5B:
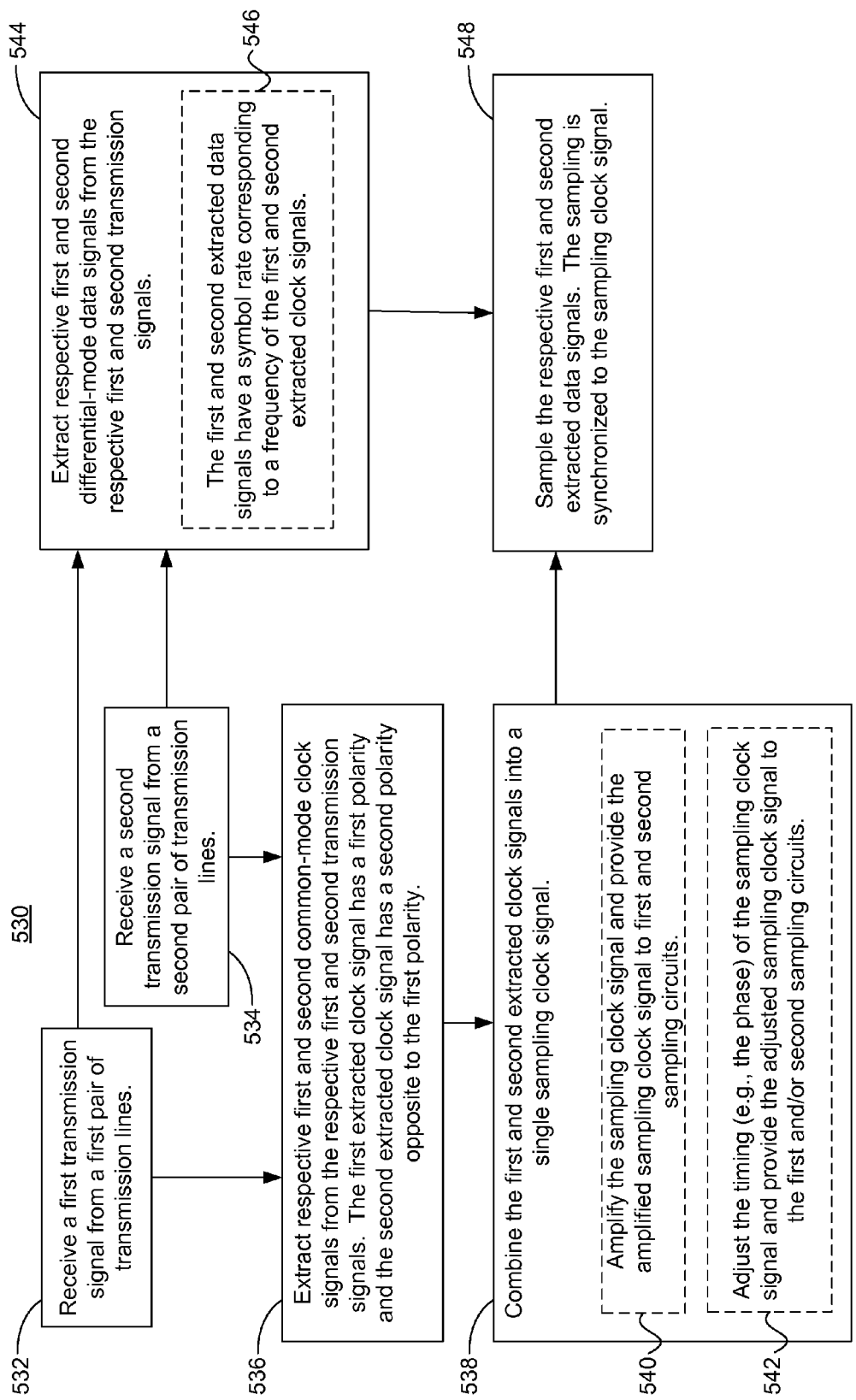

FIG. 5B is a flow diagram illustrating a method 530 of receiving data in accordance with some embodiments. While the method 530 described below includes operations that appear to occur in a specific order, it should be apparent that the method 530 can include more or fewer operations, that two or more of the operations can be performed in parallel, and that two or more operations can be combined into a single operation.

A first transmission signal is received (532) from a first pair of transmission lines (e.g., 204-1; FIGS. 3A-3D) and a second transmission signal is received (534) from a second pair of transmission lines (e.g., 204-2).

Respective first and second common-mode clock signals are extracted (536) from the respective first and second transmission signals. The first extracted clock signal has a first polarity and the second extracted clock signal has a second polarity opposite to the first polarity. For example, common-mode extraction circuits 228-1 and 228-2 (FIGS. 3A-3D) extract first and second common-mode clock signals that have opposite polarities.

The first and second extracted clock signals are combined (538) into a single sampling clock signal. For example, the combiner 310 combines the first and second common-mode clock signals extracted by the common-mode extraction circuits 228-1 and 228-2. In some embodiments, the sampling clock signal is amplified (540) and the amplified sampling clock signal is provided to first and second sampling circuits (e.g., 236-1 and 236-2). In some embodiments, the timing (e.g., the phase) of the sampling clock signal is adjusted (542) and the adjusted sampling clock signal is provided to the first and/or second sampling circuits. For example, a PLL 312 and/or a phase interpolator 314 (FIGS. 3A-3C) adjust the timing of the sampling clock signal provided to a sampling circuit.

First and second differential-mode data signals are extracted (544) from the respective first and second transmission signals. For example, the first and second differential mode extraction circuits 226-1 and 226-2 (FIGS. 3A-3D) extract respective first and second differential-mode data signals from the respective first and second transmission signals. In some embodiments, the first and second extracted data signals have a symbol rate (546) corresponding to the frequency of the first and second extracted clock signals. For example, the first and second extracted data signals have a symbol rate equal to twice the frequency of the first and second extracted clock signals.

The respective first and second extracted data signals are sampled (548). For example, the first and second sampling circuits 236-1 and 236-2 sample the respective first and second extracted data signals. The sampling is synchronized to the sampling clock signal. In some embodiments, as shown in FIGS. 3A-3E, the first and second extracted data signals and the first and second extracted clock signals are extracted simultaneously.

Figure 6A:
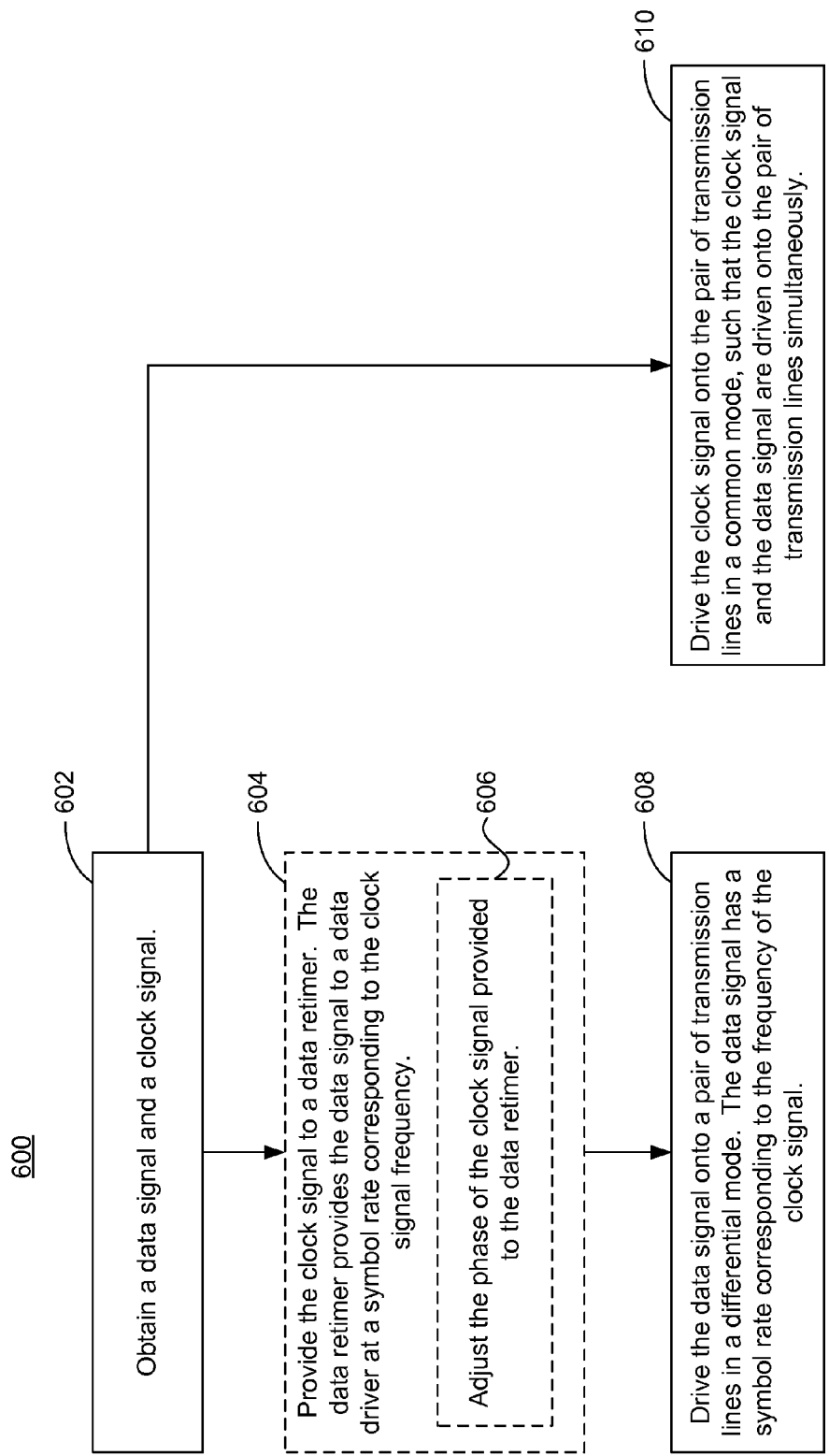
FIGS. 6A and 6B are flow diagrams illustrating a method of transmitting data in accordance with some embodiments.

FIG. 6A is a flow diagram illustrating a method 600 of transmitting data in accordance with some embodiments. While the method 600 described below includes operations that appear to occur in a specific order, it should be apparent that the method 600 can include more or fewer operations, that two or more of the operations can be performed in parallel, and that two or more operations can be combined into a single operation.

A data signal and a clock signal are obtained (602). For example, the transmitter 202 obtains for transmission a data signal 208 and a clock signal 210 (FIGS. 2A and 2B).

In some embodiments, the clock signal is provided (604) to a data retimer (e.g., 212). The data retimer provides the data signal to a data driver (e.g., 216) at a symbol rate corresponding to the clock signal frequency. For example, in some embodiments the data retimer provides the data signal to a data driver at a symbol rate equal to twice the clock signal frequency.

In some embodiments, the phase of the clock signal provided to the data retimer is adjusted (606). For example, the phase adjuster 214 receives the clock signal 210 and provides a phase-adjusted clock signal to a data retimer 212. In some embodiments, the phase adjuster 214 is a phase interpolator. In some embodiments, the phase adjuster 214 is a PLL or a DLL.

The data signal is driven (608) onto a pair transmission lines (e.g., 204) in a differential mode (e.g., by the data driver 216). The data signal has a symbol rate corresponding to the clock signal frequency. In some embodiments, the data signal has a symbol rate equal to twice the clock signal frequency.

The clock signal is driven (610) onto the pair of transmission lines in a common mode (e.g., by the clock driver 218), such that the clock signal and the data signal are driven onto the pair of transmission lines simultaneously.

Figure 6B:
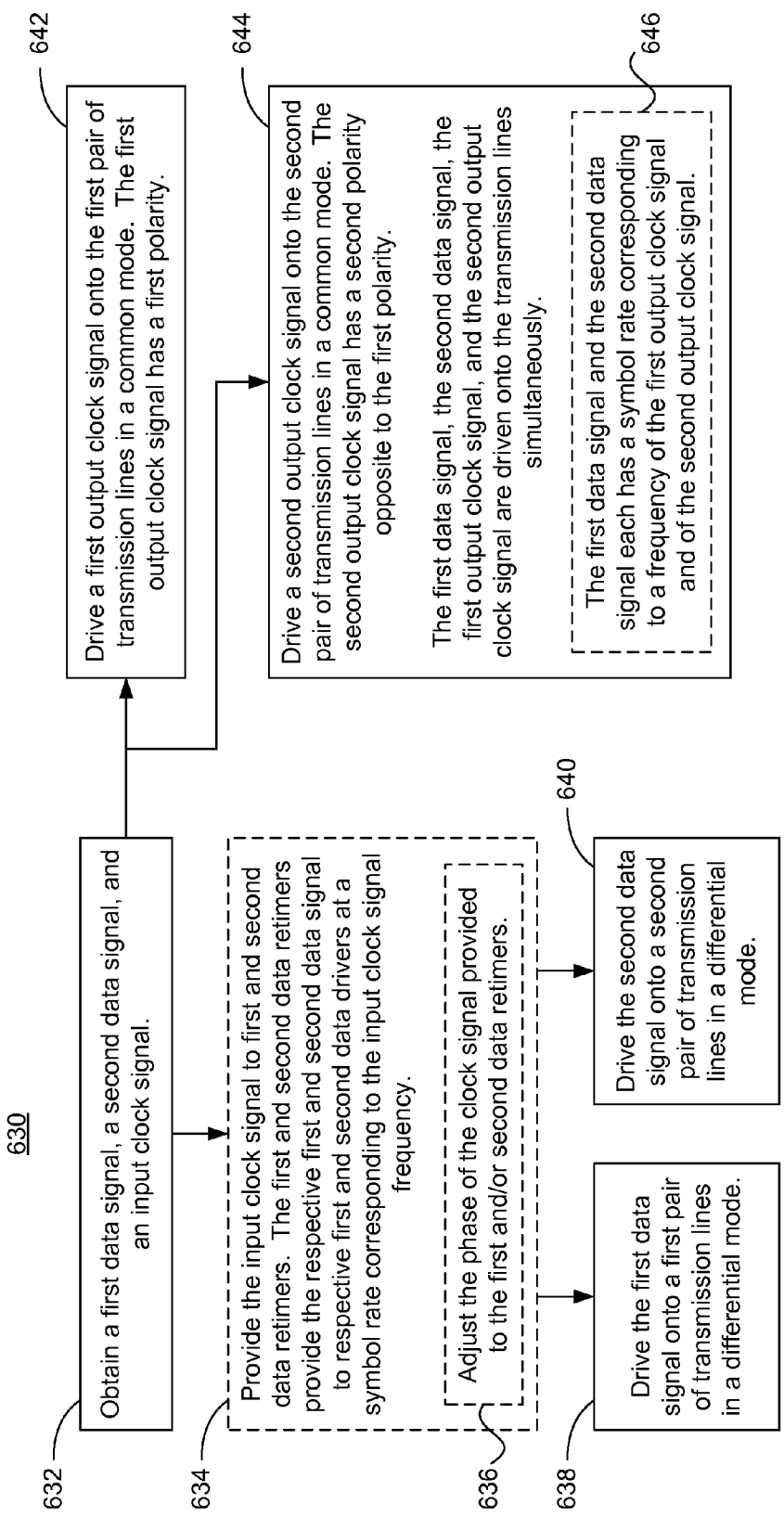

FIG. 6B is a flow diagram illustrating a method 630 of transmitting data in accordance with some embodiments. While the method 630 described below includes operations that appear to occur in a specific order, it should be apparent that the method 630 can include more or fewer operations, that two or more of the operations can be performed in parallel, and that two or more operations can be combined into a single operation.

A first data signal, a second data signal, and an input clock signal are obtained (632). For example, transmitter 302 obtains a first data signal 208-1, a second data signal 208-2, and a clock signal 210 (FIG. 3A or 3D).

In some embodiments, the input clock signal is provided (634) to first and second data retimers (e.g., 212-1 and 212-2). The first and second data retimers provide the respective first and second data signals to respective first and second data drivers at a symbol rate corresponding to the input clock signal frequency. In some embodiments, the first and second data retimers provide the respective first and second data signals to respective first and second data drivers at a symbol rate equal to twice the input clock signal frequency.

In some embodiments, the phase of the clock signal provided to the first and/or second data retimers is adjusted (636).

The first data signal is driven (638) onto a first pair of transmission lines in a differential mode and the second data signal is driven (640) onto a second pair of transmission lines in a differential mode. For example, the first and second data drivers 216-1 and 216-2 drive the respective first and second data signals onto the respective first and second transmission line pairs 204-1 and 204-2 in a differential mode.

A first output clock signal is driven (642) onto the first pair of transmission lines (e.g., 204-1) in a common mode (e.g., by the clock driver 308). The first output clock signal has a first polarity. A second output clock signal is driven (644) onto the second pair of transmission lines (e.g., 204-2) in a common mode (e.g., by the clock driver 308). The second output clock signal has a second polarity opposite to the first polarity. The first data signal, the second data signal, the first output clock signal, and the second output clock signal are driven onto the transmission lines simultaneously.

In some embodiments, the first data signal and the second data signal each has a symbol rate (646) corresponding to the frequency of the first output clock signal and of the second output clock signal. For example, in some embodiments the first data signal and the second data signal each has a symbol rate equal to twice the frequency of the first output clock signal and of the second output clock signal.

The method 630 illustrated in FIG. 6B involves transmitting two data signals, each in a differential mode on a respective pair of transmission lines, while a clock signal is effectively transmitted in a differential mode on two pairs of transmission lines, wherein each pair transmits a polarity of the clock signal in a common mode. In a complementary method, clock signals are transmitted in a differential mode on respective pairs of transmission lines and a data signal is effectively transmitted in a differential mode on two pairs of transmission lines, wherein each pair transmits a polarity of the data signal in a common mode.

In some embodiments, receiver circuitry is coupled to a Quality of Signal (QOS) evaluation block 706, as shown for a receiver 704 in a data communications system 700 (FIG. 7A) in accordance with some embodiments. The QOS evaluation block 706 characterizes voltage and/or timing margins of data signals received by the receiver 704 and provides instructions to the transmitter 702, receiver 704, or both, to improve or optimize timing and/or voltage margins, or improve power efficiency when there is excess margin. In some embodiments, the QOS evaluation block 706 provides instructions to the transmitter 702 to adjust the drive strengths of programmable data drivers (e.g., 254, FIG. 2C), clock drivers (e.g., 256), and/or cancellation drivers (e.g., 372, FIG. 3H) in the transmitter 702. Similarly, the QOS evaluation block 706 may instruct the transmitter 702 to adjust the timing of phase adjusters (e.g., 214, FIG. 2A; 307, 324, 326, and 344, FIGS. 3A-3C) in the transmitter 702. Instructions from the QOS evaluation block 706 to the receiver 704 may include instructions to adjust settings of phase adjusters (e.g., 314) or timing circuits (e.g., 244 or 312) or instructions for a sampling circuit 236 to add a voltage offset (e.g., 397 or 398, FIG. 3G) to a signal to be sampled. During calibration/optimization sequences the QOS block serves to measure the quality of the received signal and to adjust programmable circuit elements to improve or maximize the total eye opening as seen by the data receiver with respect to timing or voltage or both. In some embodiments, instructions from the QOS evaluation block 706 direct the transmitter 702 to transmit data in a particular mode, such as common mode or differential mode; the mode of transmission thus may be configurable.

The QOS evaluation block 706 is coupled to receiver calibration control circuitry 718, which provides instructions from the QOS evaluation block 706 to the receiver 704 and transmitter 702. Instructions directed to the transmitter 702 may be provided to transmitter calibration control circuitry 716 via a channel 714; the transmitter calibration control circuitry 716 then provides the instructions to the transmitter 702. Alternately, the receiver calibration control circuitry 718 communicates with the transmitter calibration control circuitry 716 via the transmission line pair 204: for example, a transmitter located in an integrated circuit that also includes the receiver 704 drives data from the receiver calibration control circuitry 718 onto the transmission line pair 204. The transmission line pair 204 thus may be bidirectional.

In addition to communicating instructions, the transmitter and receiver calibration control circuits 716 and 718 may communicate to activate a calibration mode in which the QOS evaluation block 706 characterizes voltage and timing margins and provides corresponding instructions to the transmitter 702 and receiver 704. For example, the receiver calibration control circuitry 718 activates the QOS evaluation block 706 once the calibration mode has been established.

Figure 7B:
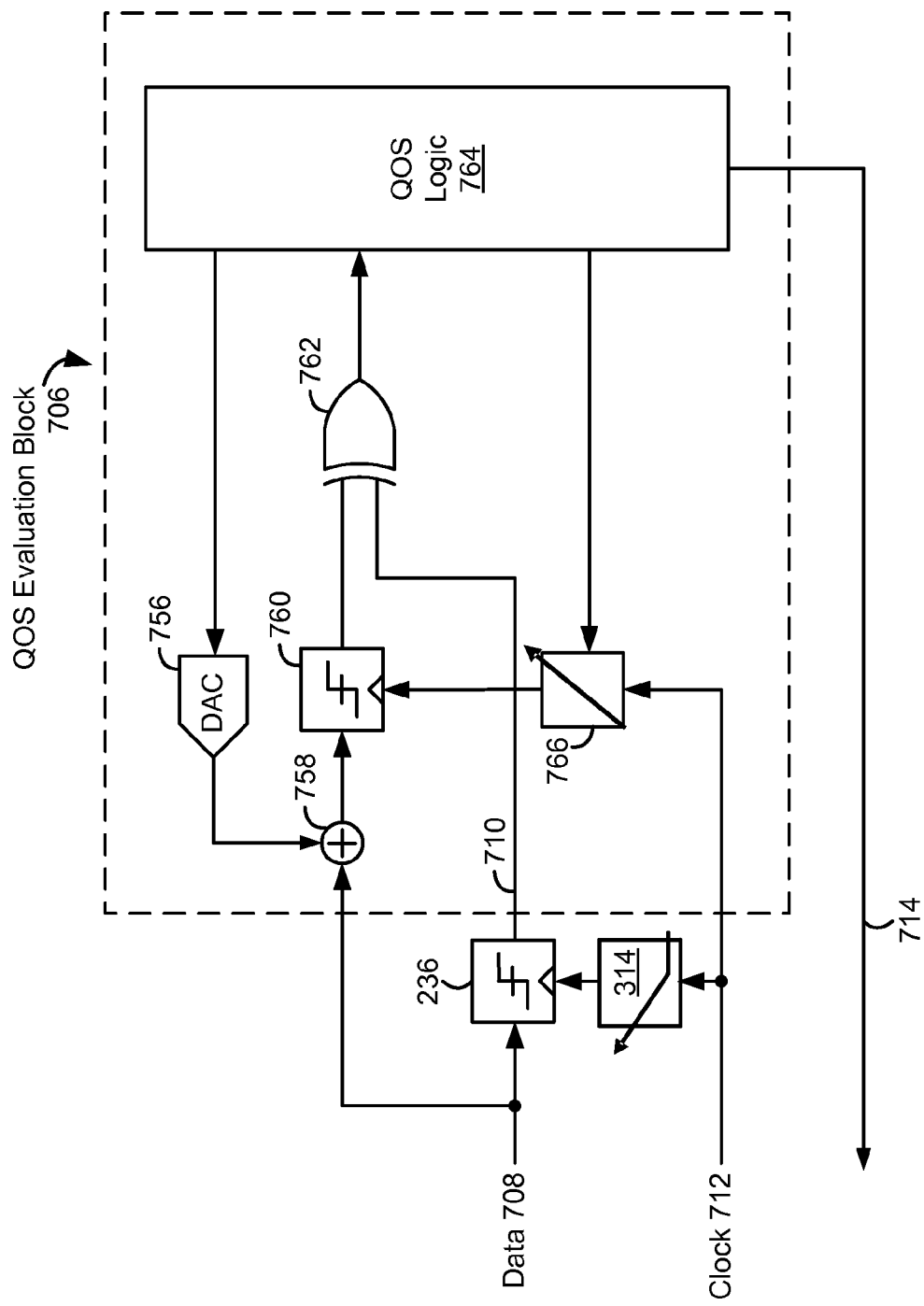
FIG. 7B is a block diagram of a Quality of Signal (QOS) evaluation block in accordance with some embodiments.

FIG. 7B is a block diagram of the QOS evaluation block 706 in accordance with some embodiments. The QOS evaluation block 706 includes QOS logic 764, a digital-to-analog converter (DAC) 756, a combiner 758, a sampling circuit 760, a variable delay 766, and an XOR gate 762. An extracted data signal 708 provided to a sampling circuit 236 in the receiver 704 also is provided to the combiner 758, which adds a voltage offset received from the DAC 756 as specified by the QOS logic 764. The combiner 758 provides the offset data signal to the sampling circuit 760, which samples the offset data signal. An extracted clock signal 712 from the receiver 704 (e.g., a clock signal extracted by a common mode extraction circuit 228 or generated by a PLL 244 or 312) is provided to the variable delay circuit 766, which has a variable delay specified by the QOS logic 764. The variable delay circuit 766 provides the delayed clock signal to the sampling circuit 760, which is synchronized to the delayed clock signal. The outputs of the sampling circuits 236 and 760 are provided to the XOR gate 762, which acts as a comparator that compares the two outputs and provides the result of the comparison to the QOS logic 764.

If the outputs of the sampling circuits 236 and 760 agree, the sampling circuit 760 is presumed to be sampling within an eye opening in a plot of signal voltage level vs. time for the receiver 704. The eye opening corresponds to a set of combinations of signal voltage levels and sampling times for which received 1's can be distinguished from received 0's. If the outputs of the sampling circuits 236 and 760 do not agree, the sampling circuit 760 is presumed to be sampling outside of the eye opening. In some embodiments, the outputs of the sampling circuits 236 and 760 are considered to agree if at least a minimum percentage (e.g., 99.999%, or more generally $1-10^{-N}$) of respective samples of the sampling circuits 236 and 760 are equal (i.e., are both 1 or 0) for a particular combination of voltage offset and delay value, and are considered not to agree if less than the minimum percentage of respective samples are equal. The QOS logic 764 thus can map out the eye opening by varying the voltage offset and delay value and comparing the outputs of the sampling circuits 236 and 760 for various combinations of voltage offset and delay values. Alternate methods exist for creating a mapping of waveform quality; any such methods can be used in QOS evaluation block 706 and to drive corresponding QOS logic.

Figure 7D:
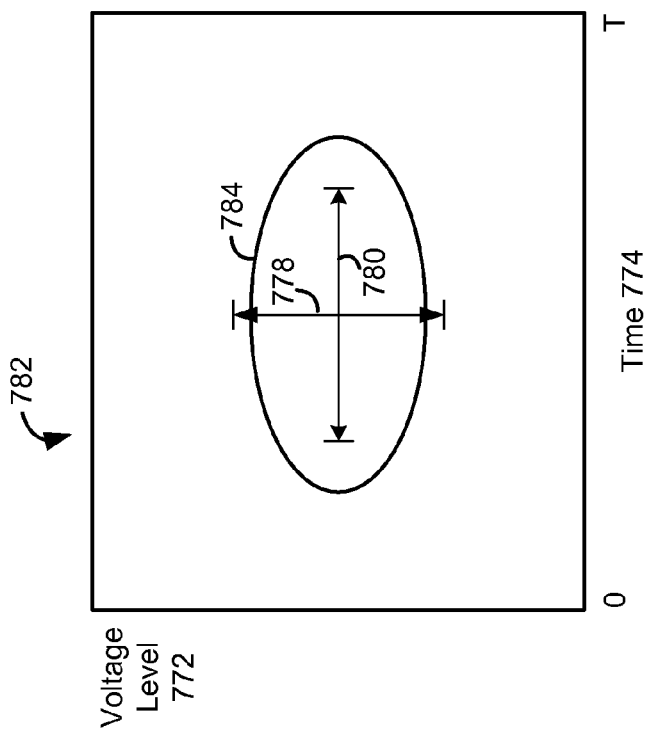
FIGS. 7C and 7D illustrate eye openings in plots of voltage level vs. time in accordance with some embodiments.
Figure 7C:
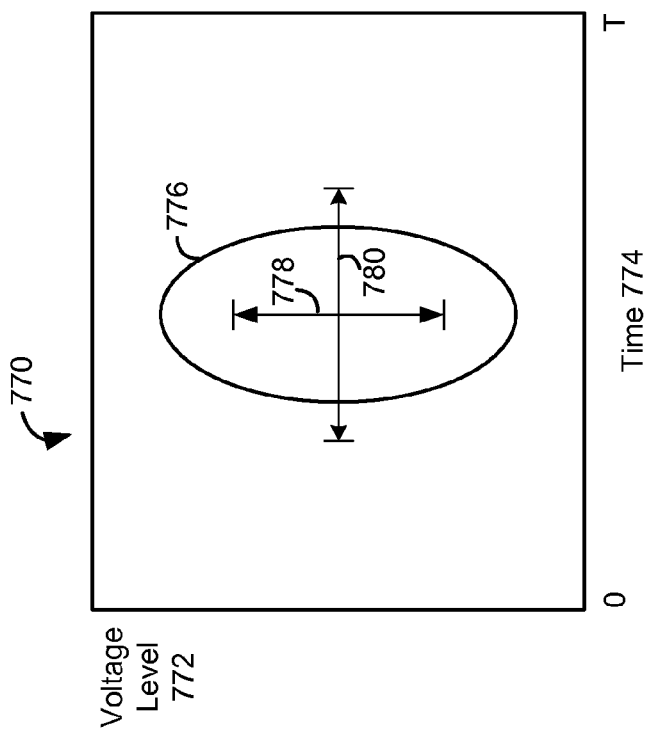

FIGS. 7C and 7D illustrate eye openings 776 and 784 in plots 770 and 782 of voltage level 772 vs. time 774 in accordance with some embodiments. The time 774 is shown as varying between zero and the symbol period T. The center of the eye opening 776 has a height greater than a defined minimum voltage margin 778, but has a width less than a defined minimum timing margin 780. The center of the eye opening 784 has a width greater than the minimum timing margin 780, but has a height less than the minimum voltage margin 778. In some embodiments, the minimum voltage margin 778 and minimum timing margin 780 are determined to ensure that the bit-error rate (BER) for the receiver 704 does not exceed a predefined maximum BER.

In some embodiments, the QOS logic 764 communicates with the transmitter 702 to adjust the drive strengths of programmable data drivers (e.g., 254, FIG. 2C) and clock drivers (e.g., 256) based on characterization of the eye diagram for the receiver 704. If characterization reveals that the height of the eye opening is insufficient, indicating a lack of voltage margin (e.g., for eye opening 784), then the drive strength of the data driver is increased (i.e., α is increased). If characterization reveals that the width of the eye opening is insufficient, indicating a lack of timing margin (e.g., for eye opening 776), then the drive strength of the clock driver is increased (i.e., α is decreased). The width of the eye opening also may be increased by adjusting the drive strength of cancellation drivers (e.g., 372, FIG. 3H) to compensate for DM-to-CM modal conversion. Iterative characterization of voltage and timing margins and adjustment of drive strength is performed until the characterized voltage and timing margins exceed the respective minimum voltage and timing margins. Furthermore, settings of phase adjusters and timing circuits may be adjusted to ensure that the data signal is sampled substantially in the middle of the eye opening and that the received eye has sufficient eye height in voltage and width in time (e.g., sufficient to ensure that predefined voltage and timing margins are satisfied, or sufficient to achieve a bit error rate less than or equal to a threshold or target bit error rate).

Figure 8:
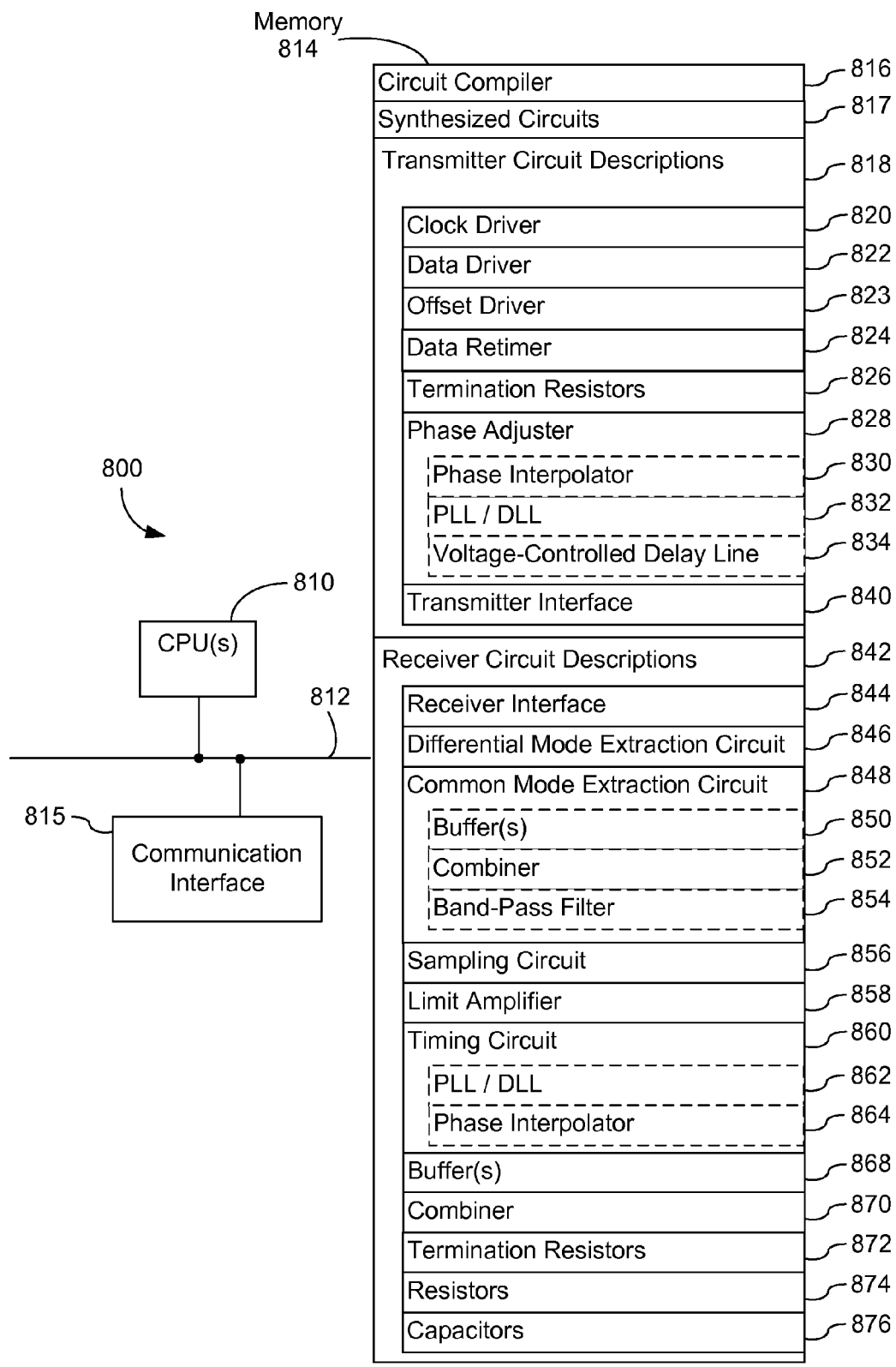
FIG. 8 is a block diagram of an embodiment of a system for storing computer readable files containing software descriptions of circuits for implementing transmitters and receivers in accordance with some embodiments.

FIG. 8 is a block diagram of an embodiment of a system 800 for storing computer readable files containing software descriptions of circuits for implementing transmitters and receivers in accordance with some embodiments. The system 800 may include one or more data processors or central processing units (CPU) 810, memory 814, (optionally) one or more communication interfaces 815 for exchanging information with other computer systems or devices, and one or more signal lines or communication busses 812 for coupling these components to one another. The communication buses 812 may include circuitry (sometimes called a chipset) that interconnects and controls communications between system components. Memory 814 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 814 may optionally include one or more storage devices remotely located from the CPU(s) 810. Memory 814, or alternately the non-volatile memory device(s) within memory 814, comprises a computer readable storage medium. In some embodiments, memory 814 stores in one or more of the previously mentioned memory devices a circuit compiler 816, transmitter circuit descriptions 818, and receiver circuit descriptions 842. The circuit compiler 816, when executed by a processor such as CPU(s) 88, processes one or more circuit descriptions to synthesize one or more corresponding circuits 817.

In some embodiments, the transmitter circuit descriptions 818 include circuit descriptions for a clock driver 820, a data driver 822, a cancellation driver 823, a data retimer 824, termination resistors 826, a phase adjuster 828, and a transmitter interface 840. In some embodiments, the circuit description for the phase adjuster 828 includes circuit descriptions for a phase interpolator 830, PLL/DLL 832, or voltage-controlled delay line 834.

In some embodiments, the receiver circuit descriptions 842 include circuit descriptions for a receiver interface 844, a differential mode extraction circuit 846, a common mode extraction circuit 848, a sampling circuit 856, a limit amplifier 858, a timing circuit 860, buffers 868, a combiner 870, termination resistors 872, resistors 874, and capacitors 876. In some embodiments, the circuit description for the common mode extraction circuit 848 includes circuit descriptions for buffers 850, a combiner 852, and a band-pass filter 854. In some embodiments, the circuit description for the timing circuit 860 includes circuit descriptions for a PLL or DLL 862 and a phase interpolator 864.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A data receiver circuit, comprising:
first and second interfaces to be coupled to first and second respective transmission lines, wherein the first and second respective transmission lines comprise a pair of transmission lines external to the data receiver circuit, to receive a transmission signal from the pair of transmission lines;
a common mode extraction circuit coupled to the first and second interfaces to extract a common-mode clock signal from the received transmission signal, the extracted clock signal having a frequency; and
a differential mode circuit, comprising:
a differential mode extraction circuit coupled to the first and second interfaces to extract a differential-mode data signal from the received transmission signal, the extracted data signal having a symbol rate equal to twice the frequency of the extracted clock signal;
a first sampling circuit synchronized to a positive phase of the extracted clock signal to sample the extracted data signal using a first voltage offset; and
a second sampling circuit synchronized to a negative phase of the extracted clock signal to sample the extracted data signal using a second voltage offset.

2. The data receiver circuit of claim 1, wherein
the first voltage offset is applied by the first sampling circuit to cancel an effect of common-mode-to-differential-mode conversion for data cycles corresponding to the positive phase of the extracted clock signal; and
the second voltage offset is applied by the second sampling circuit to cancel an effect of common-mode-to-differential-mode conversion for data cycles corresponding to the negative phase of the extracted clock signal.

3. The data receiver circuit of claim 1, wherein the first voltage offset and the second voltage offset are substantially equal in magnitude and opposite in sign.

4. The data receiver circuit of claim 1, further comprising receiver calibration control circuitry to provide the first voltage offset and the second voltage offset.

5. The data receiver circuit of claim 1, further comprising quality-of-signal evaluation circuitry to determine the first voltage offset and the second voltage offset.

6. The data receiver circuit of claim 5, wherein the quality-of-signal evaluation circuitry comprises an offset cancellation loop.

7. The data receiver circuit of claim 1, further comprising a clipping amplifier to amplify the extracted clock signal and provide the amplified clock signal to the differential mode circuit.

8. The data receiver circuit of claim 1, further comprising a timing circuit to receive the extracted clock signal and to provide a clock signal to the differential mode circuit.

9. The data receiver circuit of claim 8, wherein the timing circuit includes a phase-locked loop (PLL).

10. The data receiver circuit of claim 8, wherein the timing circuit includes a phase adjuster.

11. A data receiver circuit, comprising:
first and second interfaces to be coupled to first and second respective transmission lines, wherein the first and second respective transmission lines comprise a first pair of transmission lines external to the data receiver circuit, to receive a first transmission signal from the first pair of transmission lines;
third and fourth interfaces to be coupled to third and fourth respective transmission lines, wherein the third and fourth respective transmission lines comprise a second pair of transmission lines external to the data receiver circuit, to receive a second transmission signal from the second pair of transmission lines;
first and second common mode extraction circuits to extract respective first and second common-mode clock signals from the respective first and second transmission signals, the first and second extracted clock signals having a frequency, the first extracted clock signal having a first polarity and the second extracted clock signal having a second polarity opposite to the first polarity;
a combiner to combine the first and second extracted clock signals into a single sampling clock signal;
a first differential mode circuit, comprising:
a first differential mode extraction circuit coupled to the first and second interfaces to extract a first differential mode data signal from the first received transmission signal, the first differential mode data signal having a symbol rate equal to twice the frequency of the first and second extracted clock signals;
a first sampling circuit synchronized to a positive phase of the sampling clock signal to sample the first extracted data signal; and
a second sampling circuit synchronized to a negative phase of the sampling clock signal to sample the first extracted data signal; and
a second differential mode circuit, comprising:
a second differential mode extraction circuit coupled to the third and fourth interfaces to extract a second differential mode data signal from the second received transmission signal, the second differential mode data signal having a symbol rate equal to twice the frequency of the first and second extracted clock signals;
a third sampling circuit synchronized to a positive phase of the sampling clock signal to sample the second extracted data signal; and
a fourth sampling circuit synchronized to a negative phase of the sampling clock signal to sample the second extracted data signal.

12. The data receiver circuit of claim 11, wherein the combiner comprises a differential mode extraction circuit to extract the sampling clock signal from the first and second extracted clock signals.

13. The data receiver circuit of claim 11, wherein:
the first and second sampling circuits apply respective first and second voltage offsets to the first extracted data signal; and
the third and fourth sampling circuits apply respective third and fourth voltage offsets to the second extracted data signal.

14. The data receiver circuit of claim 13, wherein:
the first voltage offset is applied by the first sampling circuit to cancel an effect of common-mode-to-differential-mode conversion for data cycles of the first extracted data signal that correspond to the positive phase of the sampling clock signal;
the second voltage offset is applied by the second sampling circuit to cancel an effect of common-mode-to-differential-mode conversion for data cycles of the first extracted data signal that correspond to the negative phase of the sampling clock signal;

the third voltage offset is applied by the third sampling circuit to cancel an effect of common-mode-to-differential-mode conversion for data cycles of the second extracted data signal that correspond to the positive phase of the sampling clock signal; and the fourth voltage offset is applied by the fourth sampling circuit to cancel an effect of common-mode-to-differential-mode conversion for data cycles of the second extracted data signal that correspond to the negative phase of the sampling clock signal.

15. The data receiver circuit of claim 13, wherein:
the first and second voltage offsets are substantially equal in magnitude and opposite in sign; and
the third and fourth voltage offsets are substantially equal in magnitude and opposite in sign.

16. The data receiver circuit of claim 13, further comprising receiver calibration control circuitry to provide the first, second, third and fourth voltage offsets.

17. The data receiver circuit of claim 13, further comprising quality-of-signal evaluation circuitry to determine the first, second, third and fourth respective voltage offsets.

18. The data receiver circuit of claim 17, wherein the quality-of-signal evaluation circuitry comprises an offset cancellation loop.

19. The data receiver circuit of claim 11, further comprising a clipping amplifier to amplify the sampling clock signal and provide the amplified sampling clock signal to the first and second differential mode circuits.

20. The data receiver circuit of claim 11, further comprising a timing circuit to receive the sampling clock signal and to provide a clock signal to the first and second differential mode circuits.

21. The data receiver circuit of claim 20, wherein the timing circuit includes a phase-locked loop (PLL).

22. The data receiver circuit of claim 21, wherein the timing circuit further includes a phase adjuster coupled to the PLL and to the first differential mode circuit, wherein the phase adjuster adjusts the phase of the clock signal provided to the first differential mode circuit.

23. A method of receiving data, comprising:
receiving a transmission signal from a pair of transmission lines;
extracting a common-mode clock signal from the received transmission signal, the extracted clock signal having a frequency;
extracting a differential-mode data signal from the received transmission signal, the extracted data signal having a symbol rate equal to twice the frequency of the extracted clock signal;
sampling the extracted data signal at a first sampling circuit using a first voltage offset, wherein the sampling at the first sampling circuit is synchronized to a positive phase of the extracted clock signal;
sampling the extracted data signal at a second sampling circuit using a second voltage offset, wherein the sampling at the second sampling circuit is synchronized to a negative phase of the extracted clock signal.

24. A method of receiving data, comprising:
receiving a first transmission signal from a first pair of transmission lines;
receiving a second transmission signal from a second pair of transmission lines;
extracting respective first and second common-mode clock signals from the respective first and second transmission signals, the first and second extracted clock signals having a frequency, the first extracted clock signal having a first polarity and the second extracted clock signal having a second polarity opposite to the first polarity;
combining the first and second extracted clock signals into a single sampling clock signal;
extracting respective first and second differential-mode data signals from the respective first and second transmission signals, the first and second differential mode data signals each having a symbol rate equal to twice the frequency of the first and second extracted clock signals;
sampling the first extracted data signal at first and second sampling circuits, wherein the sampling at the first sampling circuit is synchronized to a positive phase of the sampling clock signal and the sampling at the second sampling circuit is synchronized to a negative phase of the sampling clock signal; and
sampling the second extracted data signal at third and fourth sampling circuits, wherein the sampling at the third sampling circuit is synchronized to a positive phase of the sampling clock signal and the sampling at the fourth sampling circuit is synchronized to a negative phase of the sampling clock signal.

* * * * *